United States Patent
Yamaguchi

(10) Patent No.: US 7,696,719 B2
(45) Date of Patent: Apr. 13, 2010

(54) POWER CONTROL APPARATUS, POWER CONTROL METHOD

(75) Inventor: Kazuhi Yamaguchi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 480 days.

(21) Appl. No.: 11/714,152

(22) Filed: Mar. 6, 2007

(65) Prior Publication Data

US 2007/0213921 A1    Sep. 13, 2007

(30) Foreign Application Priority Data

Mar. 7, 2006    (JP) .............................. 2006-060618

(51) Int. Cl.
*H02J 7/00*    (2006.01)
*B60K 1/00*    (2006.01)
*B60K 1/04*    (2006.01)
*B65G 65/00*    (2006.01)

(52) U.S. Cl. .................... 320/109; 320/104; 414/281; 104/34; 180/65.1

(58) Field of Classification Search .............. 320/109, 320/104
See application file for complete search history.

(56) References Cited

U.S. PATENT DOCUMENTS

| | | | |
|---|---|---|---|
| 6,208,931 B1 * | 3/2001 | Schoettle et al. ............ 701/115 |
| 2002/0107618 A1 | 8/2002 | Deguchi et al. | |
| 2005/0274553 A1 | 12/2005 | Salman et al. | |

FOREIGN PATENT DOCUMENTS

| | | |
|---|---|---|
| EP | 1 246 339 A1 | 10/2002 |
| EP | 1 256 476 A2 | 11/2002 |
| EP | 1 383 224 A1 | 1/2004 |
| GB | 2 360 644 A | 9/2001 |
| JP | A-10-327542 | 12/1998 |
| JP | A-2001-505847 | 5/2001 |
| JP | A-2001-314002 | 11/2001 |
| JP | A-2003-061400 | 2/2003 |
| JP | A-2004-203386 | 7/2004 |
| JP | A-2004-249900 | 9/2004 |
| JP | A-2007-049779 | 2/2007 |

OTHER PUBLICATIONS

Ehsani et al., "On Board Power Management," IEEE; pp. 11-17, 2004.

* cited by examiner

*Primary Examiner*—Edward Tso
*Assistant Examiner*—Yalkew Fantu
(74) *Attorney, Agent, or Firm*—Oliff & Berridge, PLC

(57) ABSTRACT

A battery requiring power generation determining unit is operable to determine first power required by the battery depending on a battery condition. An electric component using power determining unit is operable to determine second power used by the electric components. An feeding indispensable power determining unit is operable to determine feeding indispensable power. A power generation determining unit is operable to determine a first power generation to be generated by the generator based on the first power, the second power, and the feeding indispensable power. The feeding indispensable power determining unit determines the feeding indispensable power depending on a running mode of the vehicle.

5 Claims, 17 Drawing Sheets

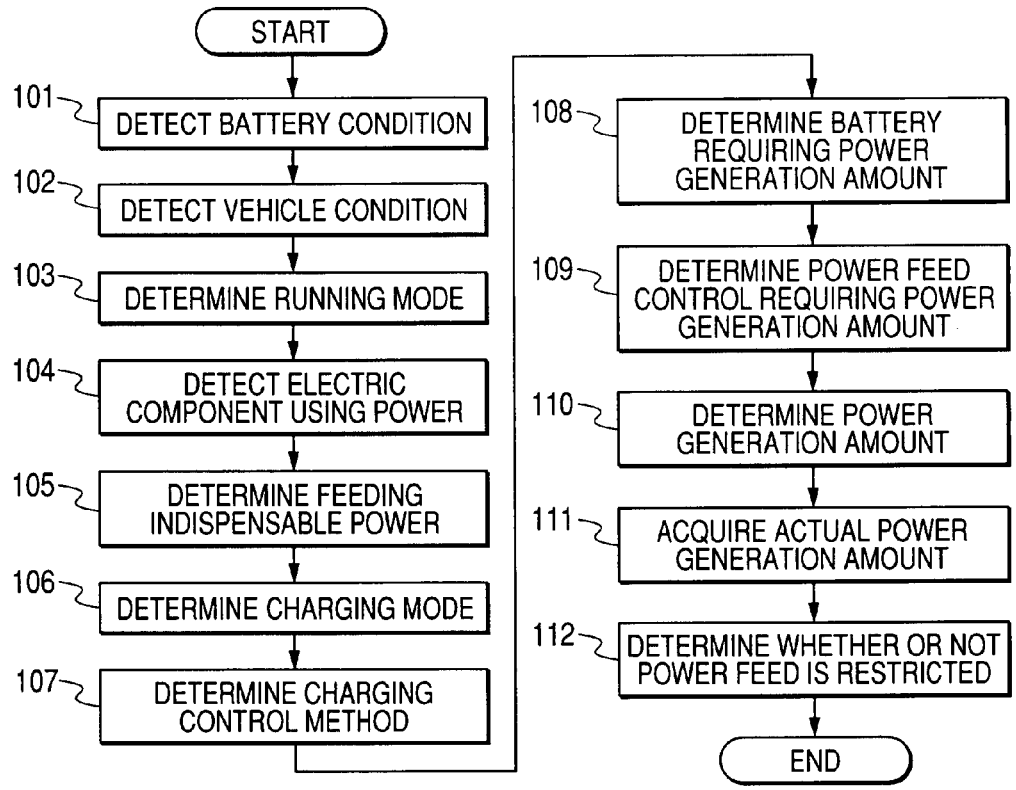

| ELECTRIC COMPONENT USING POWER: 1.2KW | FEEDING INDISPENSABLE POWER: 0.6KW | BATTERY CHARGING REQUIRING AMOUNT: 1.2KW |
|---|---|---|
| SUM OF POWER GENERATION REQUIRED: 3.0KW | | |

| ELECTRIC COMPONENT USING POWER: 1.2KW | FEEDING INDISPENSABLE POWER: 0.2KW | BATTERY CHARGING REQUIRING AMOUNT: 1.2KW |
|---|---|---|
| SUM OF POWER GENERATION REQUIRED: 2.6KW | | |

FIG. 7(A)

| ELECTRIC COMPONENT USING POWER: 1.2KW | FEEDING INDISPENSABLE POWER: 0.6KW |
|---|---|
| BATTERY DISCHARGEABLE POWER: 1.6KW | POWER GENERATION AMOUNT: 0.2KW |

DRIVEABILITY PREFERENCE

FIG. 7(B)

| ELECTRIC COMPONENT USING POWER: 1.2KW | FEEDING INDISPENSABLE POWER: 0.6KW |
|---|---|
| POWER GENERATION REQUIRING AMOUNT: 1.8KW ||

BATTERY CHARGING PREFERENCE

FIG. 8

| UNIT NAME | PRIORITY | REQUIRED POWER [W] | | |
|---|---|---|---|---|
| | | LEVEL 1 | LEVEL 2 | LEVEL 3 |
| AIR CONDITIONER | 2 | 360 | 480 | 600 |
| LIGHT | 1 | 60 | 80 | — |
| NAVIGATOR | 1 | 150 | — | — |
| SEAT HEATER | 3 | 120 | 144 | |
| MASSAGE CHAIR | 4 | 120 | 144 | |
| MIRROR HEATER | 3 | 120 | 144 | |
| DE-FOGGER | 2 | 120 | — | — |

POWER CONTROL APPARATUS, POWER CONTROL METHOD

The disclosure of Japanese Patent Application No. 2006-060618 filed Mar. 7, 2006 including specification, drawings and claims are incorporated herein by reference in its entirety.

BACKGROUND

The present invention relates to a power control apparatus and a power control method for performing a power generation control of a generator which charges a battery to supply power to vehicle mounted electric components and performing a load restriction of the vehicle mounted electric components.

An electronic control unit (ECU) of a vehicle controls the vehicle by exchanging signals with control mechanisms of the vehicle. For example, when information such as a car speed, an engine RPM, the amount of air inflow and so on, which are detected by a sensor group equipped within a vehicle is input to an engine control ECU, the engine control ECU performs a predetermined calculation process based on the input information, and sends the calculated result (for example, a signal to control fuel injection amount, bypass air amount or the like) to the control mechanism, such as an electric throttle or a starter injection valve, equipped within the vehicle, to control the fuel injection amount, air inflow amount or the like.

In recent years, with rapid spread of automobiles, the number of automobile ECUs and vehicle mounted electric components have sharply increased to meet needs for improvement of comfort, safety, convenience and so on. For example, for a running system, there are the above-mentioned engine control ECU, a brake control ECU to control a brake, a steering control ECU to control steering, an economical running system to run a vehicle while activating and deactivating an engine, etc. In addition, for ensuring safety, there is a collision mitigation brake system (CMBS) (or a pre-crash system), an airbag system, an anti-brake system (ABS), a skidding protection system, etc. Also, for improving convenience, there is a push start system, a keyless system, an electromotive slide door, and for comfort, there is an AV system, an air conditioner, a navigation apparatus, etc.

In addition, for further improvement of comfort, convenience and safety in the future, the number of vehicle mounted electric components are expected to increase. Examples may include a road-to-vehicle communication system, a high performance driving system, an automatic drive system, an accident avoidance system, a collision avoidance system, a vehicle peripheral area monitoring system, etc. It can be expected that a battery will deteriorate with increased load on the battery, and will lack power with an increase in the number of electric components. Therefore, charging control of a battery to suppress deterioration of the battery and preventing disability of power feed in a vehicle condition is performed.

FIG. 16 is a view illustrating a charging control method. As shown in FIG. 16, if the amount of feeding indispensable power for a safety system, for example, a pre-crash system, an ABS, etc, is 1 KW, the amount of power required for electric components is 1.5 KW, and the amount of required battery charging is 0.5 KW, the amount of required power generation in a generator is 3 KW. In consideration of a vehicle running condition, the amount of power generation in the generator is determined to be 3 KW in deceleration of a vehicle and determined to be 2.5 KW in acceleration of the vehicle.

FIG. 17 is a view illustrating a power feeding restricting method. As shown in FIG. 17, if the amount of power generation in a generator is 1 KW, the amount of dischargeable electricity of a battery is 1 KW, and the amount of feeding indispensable power is 1 KW, the amount of power required for electric components is 1.5 KW, since a shortage 0.5 KW, power feeding to the electric components is restricted depending on using priority of the electric components with 0.5 KW as the amount of load limitation.

As mentioned above, the amount of power generation in the generator and the amount of power fed to the electric components have been controlled based on a battery condition, a running mode and the amount of necessary feeding electricity for the electric components. In Japanese Patent Publication No. 2001-505847A (corresponding U.S. Pat. No. 6,208,931, a running prediction unit is used and the amount of power generation is controlled based on the predicting result by the running prediction unit.

Specifically, as shown in FIG. 18, a prospective average engine RPM is calculated based on information from a navigation system, such as a running period, a road form, a road condition and the like, and, based on the prospective engine RPM and the battery condition, an evaluation is performed to execute energy management.

As described above, although the amount of power generation in the generator and the amount of power fed to the electric components have been controlled based on the battery condition, the running mode and the amount of necessary feeding electricity for the electric components, there is a problem that fuel efficiency is decreased due to the increased amount of power generation since the amount of feeding indispensable power is fixed and the amount of required power is calculated according to the maximum amount of feeding indispensable power irrespective of the running mode.

In addition, although the amount of power generation is controlled based on the predicting result by the running prediction unit, an energy distribution is determined based on only the average engine RPM and the battery condition. Accordingly, there is a possibility of disability of power feed or decrease of fuel efficiency since power generation cut by the running mode can not be considered with only the engine RPM.

SUMMARY

It is therefore an object of the invention to provide a power control apparatus and a power control method for restricting the amount of power generation and hence preventing fuel efficiency from being decreased by setting the feeding indispensable power depending on a running mode of the vehicle and determining the amount of power generation based on a predicted running mode.

In order to achieve the above-mentioned object, according to the invention there is provided a power control apparatus operable to perform a power generation control of a generator which charges a battery provided on a vehicle and feeds to electric components provided on the vehicle, the power control apparatus comprising:

a battery requiring power generation determining unit operable to determine a first power required by the battery depending on a battery condition;

an electric component using power determining unit operable to determine a second power used by the electric components;

a feeding indispensable power determining unit operable to determine a feeding indispensable power; and a power generation determining unit operable to determine a first power generation amount to be generated by the generator based on the first power, the second power, and the feeding indispensable power, wherein the feeding indispensable power determining unit determines the feeding indispensable power depending on a running mode of the vehicle.

The power control apparatus may further comprise:

a charging mode determining unit operable to determine a charging mode depending on the battery condition; and a charging control method determining unit operable to determine a charging control method depending on the charging mode and the running mode, wherein the battery requiring power generation determining unit determines the first power depending on the charging control method and the battery condition.

The power control apparatus may further comprise:

a feeding control requiring power generation determining amount operable to determine a feeding control requiring power generation amount based on the second power and the feeding indispensable power; and a feeding control judging unit operable to judge whether a feeding restriction is performed depending on the feeding control requiring power generation amount and an actual power generation amount of the generator.

With the above described configuration, since the feeding indispensable power is determined depending on the running mode, the first power generation amount can be determined as the minimum amount of feeding indispensable power, thereby preventing decrease of fuel efficiency due to an increase of the amount of power generation.

The power control apparatus may further comprise:

an external information detection unit operable to detect external information;

a predicting unit operable to predict transition of parameters related to the power generation control for each area based on the detected external information; and a power generation calculating unit operable to calculate a second power generation amount to be generated by the generator based on a predicted transition of the parameters, wherein a third power generation amount is determined by adjusting the first power generation amount based on the second power generation amount.

The third power generation amount may be determined depending on a difference between the first power generation amount and the second power generation amount.

The power control apparatus may further comprise:

a drive characteristic detecting unit operable to detect drive characteristic of a driver, wherein the predicted transition of the parameters are corrected based on the detected drive characteristic.

With the above described configuration, the disability of power feed and the decrease of fuel efficiency can be reliably prevented.

The feeding indispensable power may be power required in a case where electric components related to a safety system of the vehicle is activated.

The feeding indispensable power may be power required in a case where a predetermined electric component is activated.

According to the invention, there is also provided a power control apparatus operable to perform a power generation control of a generator which feeds to electric components, the power control apparatus comprising:

a power generation determining unit operable to determine a first power generation amount to be generated by the generator based on a first power consumed by an electric component which is currently activated in the electric components and a feeding indispensable power required in a case where an electric component related to a safety system of the vehicle is activated, wherein the power generation determining unit changes the feeding indispensable power depending on a inning mode of the vehicle.

The electric component related to the safety system may include at least one of an airbag system, an anti-brake system; a pre-crush system, and skidding prevention system.

According to the invention, there is also provided a power control apparatus operable to perform a power generation control of a generator which feeds to electric components, the power control apparatus comprising:

a power generation determining unit operable to determine a first power generation amount to be generated by the generator based on a first power consumed by an electric component which is currently activated in the electric components, and a feeding indispensable power required in a case where an electric component which is currently deactivated is activated, wherein the power generation determining unit changes the feeding indispensable power depending on a running mode of the vehicle.

According to the invention, there is also provided a power control apparatus operable to perform a power generation control of a generator which feeds to electric components including a navigation system, the power control apparatus comprising:

an electric component using a power determining unit operable to detect a first power consumed by an electric component which is currently activated in the electric components;

an electric component using a power predicting unit operable to predict a second power consumed by an electric component which is predicted to be activated in the electric components based on a running mode of the vehicle and external information acquired from the navigation system; and a power generation determining unit operable to determine a first power generation amount to be generated by the generator based on the detected first power and the predicted second power.

According to the invention, there is also provided a power control method for performing a power generation control of a generator which charges a battery provided on a vehicle and feeds to electric components provided on the vehicle, the power control method comprising:

determining a first power required by the battery depending on a battery condition;

determining a second power used by the electric components;

determining a feeding indispensable power; and determining a first power generation amount to be generated by the generator based on the first power, the second power, and the feeding indispensable power, wherein the feeding indispensable power is determined depending on a running mode of the vehicle.

According to the invention, there is also provided a power control method for performing a power generation control of a generator which feeds to electric components, the power control method comprising:

determining a first power consumed by an electric component which is currently activated in the electric components;

determining a feeding indispensable power required in a case where an electric component related to safety system of the vehicle is activated;

determining a first power generation amount to be generated by the generator based on the first power and the feeding indispensable power, wherein the feeding indispensable power is changed depending on a running mode of the vehicle.

According to the invention, there is also provided a power control method for performing a power generation control of a generator which feeds to electric components, the power control method comprising:

determining a first power consumed by an electric component which is currently activated in the electric components;

determining a feeding indispensable power required in a case where an electric component which is currently deactivated is activated; and determining a first power generation amount to be generated by the generator based on the first power and the feeding indispensable power, wherein the feeding indispensable power is changed depending on a running mode of the vehicle.

According to the invention, there is also provided a power control method for performing a power generation control of a generator which feeds to electric components including a navigation system, the power control method comprising:

detecting a first power consumed by an electric component which is currently activated in the electric components;

predicting a second power consumed by an electric component which is predicted to be activated in the electric components based on a running mode of the vehicle and external information acquired from the navigation system; and determining a first power generation amount to be generated by the generator based on the detected first power and the predicted second power.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a flow chart illustrating operations of functional parts of the power control apparatus;

FIG. 4 shows an example of a table indicating whether or not power is fed;

FIGS. 7(A) and 7(B) shows an example of the amount of required power generation in driveability preference and battery charging preference;

FIG. 8 shows an example of a table indicating priority and power consumption data of the electric components;

DETAILED DESCRIPTION OF THE EMBODIMENTS

Hereinafter, a power control apparatus and a power control method according to embodiments of the invention will be described with reference to the accompanying drawings.

First Embodiment

Figure 1:
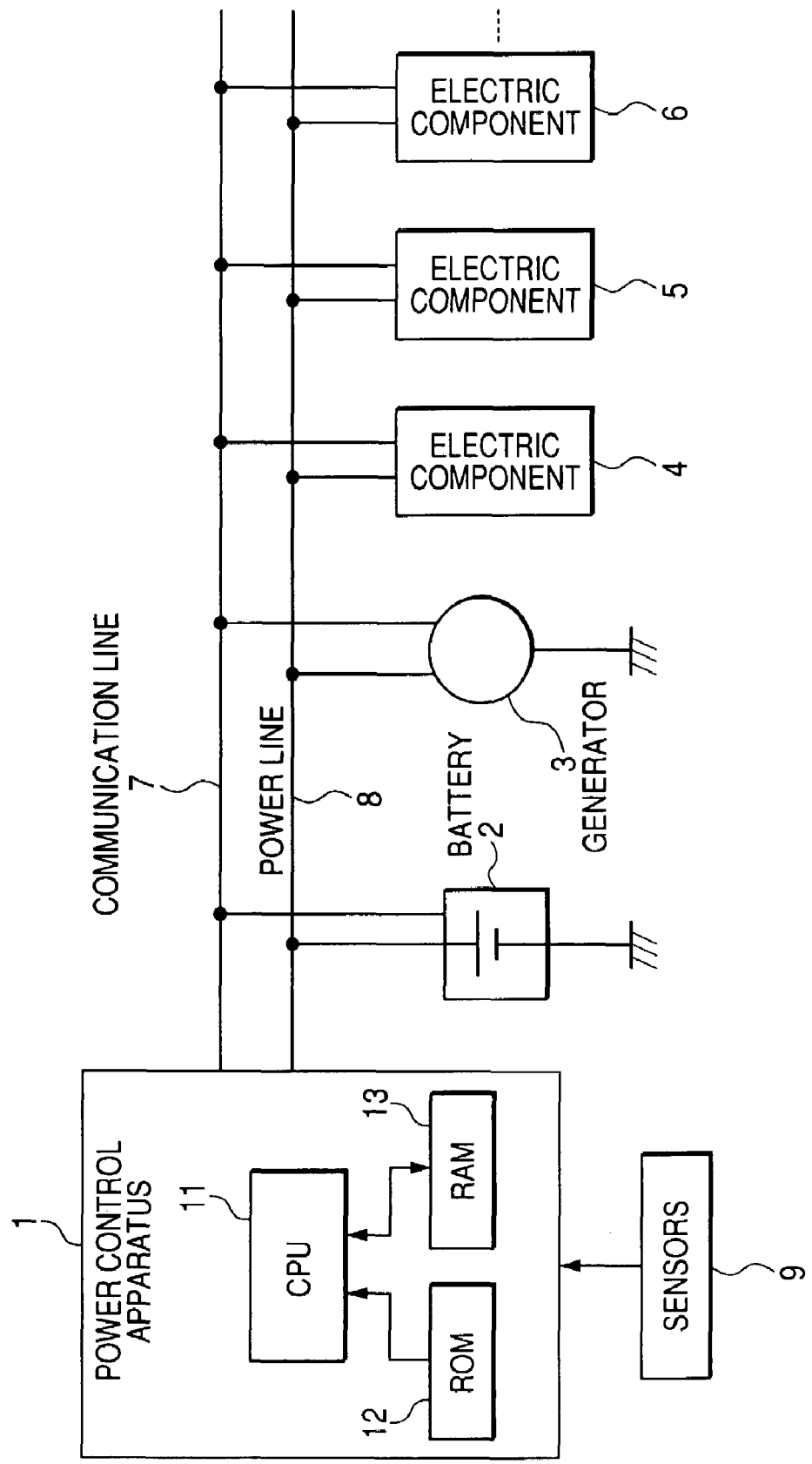
FIG. 1 is a block diagram showing a configuration of a power control system including a power control apparatus according to a first embodiment of the invention.

FIG. 1 is a block diagram showing a configuration of a power control system including a power control apparatus according to a first embodiment of the invention. As shown in the FIG. 1, the power control system includes a power control apparatus 1, a battery 2, a generator 3, and electric components 4, 5, 6 which are equipped in a vehicle. The power control apparatus 1, the battery 2, the generator 3, and the electric components 4, 5, 6 are interconnected via a communication line 7 and a power line 8. In addition, the power control apparatus 1 receives various sensor values and information on switch ON/OFF states from various kinds of sensors 9 such as a car speed sensor, an engine RPM sensor, a shift position sensor, an ignition (IG) switch, an accessory (ACC) switch and the like.

The power control apparatus 1 detects conditions of the battery 2 or conditions of the vehicle and controls power generation of the generator 3 and feed of power to the electric components 4, 5, 6. The power control apparatus 1 includes a CPU 11, a ROM (Read Only Memory) 12, a RAM (Random Access Memory) 13, an input/output circuit (not shown), etc. The CPU 11 controls hardware components of the power control apparatus 1 and executes various programs related to control of power generation, which are stored in the ROM 12. The ROM stores the power generation control programs as mentioned above, and the RAM 13 such as a SRAM stores temporarily produced data.

In addition, the battery 2 feeds power to the electric components 4, 5, 6 via the power line 8. The battery 2 includes sensors (not shown) that detect charging/discharging current, a terminal voltage, and temperature of battery solution of the battery 2. Outputs of these sensors are input to the power control apparatus 1 via the communication line 7. The generator 3 is actuated by an engine (not shown), charges the battery 2 and supplies power to electric loads of the vehicles via the power line 8.

On the other hand, the electric components 4, 5, 6 refer to various kinds of electric components which are equipped within the vehicle. The electric components 4, 5, 6 inform the power control apparatus 1 of their own starting states and driving states or their own determined power consumption via the communication line 7.

Figure 2:
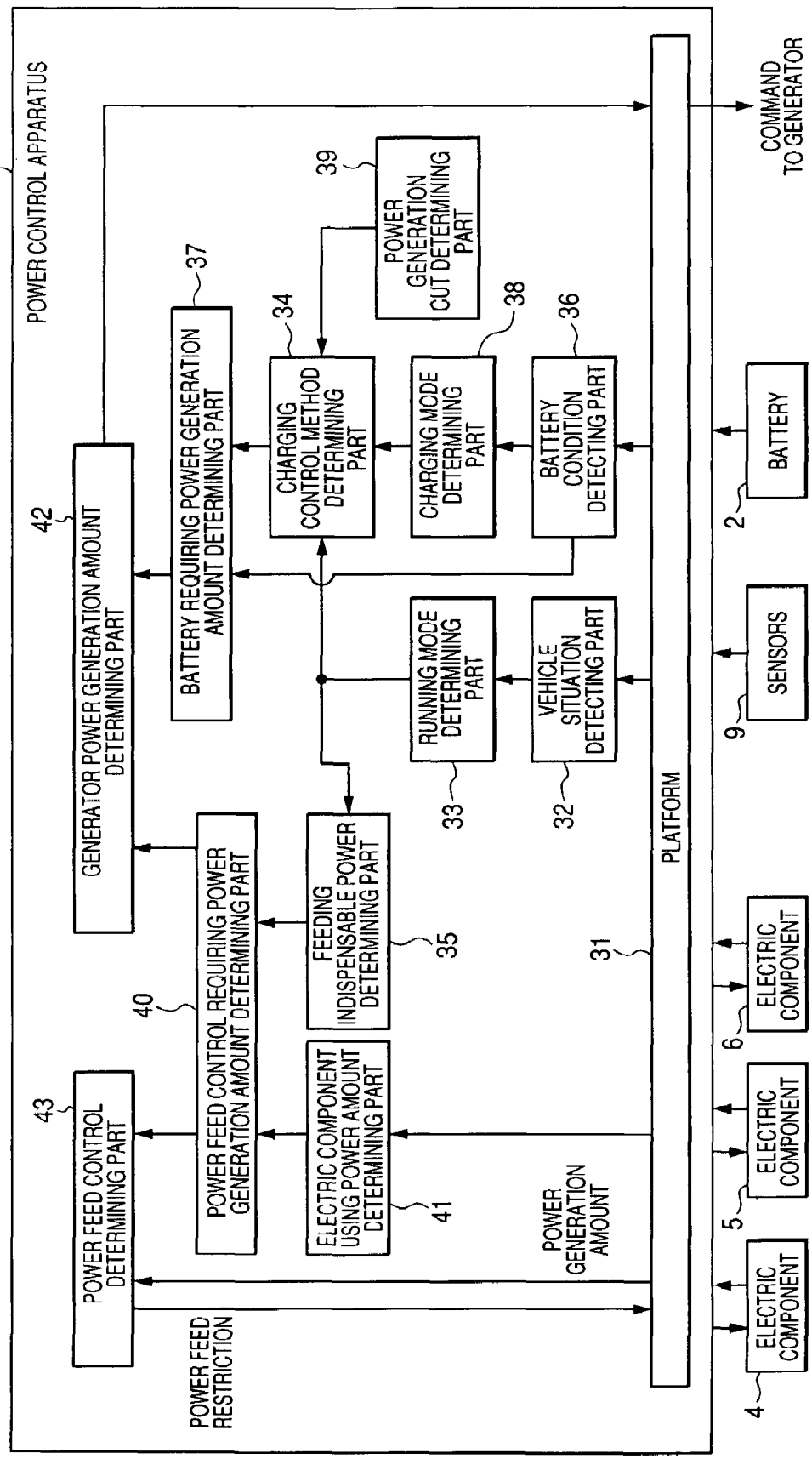
FIG. 2 is a functional block diagram showing a functional configuration of the power control apparatus.

FIG. 2 is a functional block diagram showing a functional configuration of the power control apparatus 1 shown in FIG. 1. Each of components of the power control apparatus 1 includes the CPU 11, the ROM 12 and the RAM 13 and their directions are performed by software.

A vehicle situation detecting part 32 receives information such as an engine RPM, a shift situation, an accelerator opening rate and so on from the sensors 9 via a platform 31 that performs input/output of data, and a running mode determining part 33 determines a running mode such as acceleration, deceleration, idling, or constant speed based on the information from the vehicle situation detecting part 32, and informs a charging control method determining part 34 and a feeding indispensable power determining part 35 of the determined running mode.

In addition, a battery condition detecting part 36 detects a charging rate (or a state of charge (SOC)) or internal resistance of the battery 2 based on a voltage, current, and battery solution temperature of the battery 2, which are input via the platform 31 and inputs the detected charging rate or internal resistance to a battery requiring power generation amount determining part 37 and a charging mode determining part 38. The charging mode determining part 38 determines a charging mode which is described later based on the charging rate of the battery 2, and informs the charging control method determining part 34 of the determined charging mode. A power generation cut determining part 39 determines whether or not power generation cut is required in acceleration of the vehicle depending on driver's drive characteristic which is described later, or a setting by the driver, and informs the charging control method determining part 34 of the determined power generation cut. In addition, the charging control method determining part 34 determines a charging control method which is described later, based on the running mode informed from the running mode determining part 33, the charging mode informed from the charging mode determining part 38, and the information informed from the power generation cut determining part 39, and informs the battery requiring power generation amount determining part 37 of the determined charging control method. The battery requiring power generation amount determining part 37 determines the battery requiring power generation amount based on the charging rate of the battery 2 input from the battery condition detecting part 36 and the charging control method informed from the charging control method determining part 34.

On the other hand, the feeding indispensable power determining part 35 determines feeding indispensable power based on the running mode informed from the running mode determining part 33 and inputs the determined feeding indispensable power to a power feed control requiring power generation amount determining part 40. An electric component power using amount determining part 41 determines electric component using power which is power consumption of the activated electric components which are related to safety system, and of the other activated electric components based on starting states and driving states of the electric components 4, 5, 6 which are input via the platform 31, and inputs the determined power consumption to the power feed control requiring power generation amount determining part 40. In addition, the power feed control requiring power generation amount determining part 40 determines the power feed control requiring power generation amount based on the power (feeding indispensable power) required from the feeding indispensable power determining part 35 and the power (electric component using power) required from the electric component power using amount determining part 41. Here, the feeding indispensable power represents power required when the electric components which are related to the safety system, such as, for example, pre-crash, ABS, are activated.

In addition, in this embodiment, although the power consumption of the electric components is determined by the electric component power using amount determining part 41 based on the starting states and driving states of the electric components, the power control apparatus 1 may be informed of the power consumption of the electric components when the electric components are started.

A generator power generation amount determining part 42 determines the power generation amount of the generator 3, based on the battery requiring power generation amount from the battery requiring power generation amount determining part 37 and the power feed control requiring power generation amount from the power feed control requiring power generation amount determining part 40, and transmits a generator power generation command signal to the generator 3 via the communication line 7. Then, the generator 3 generates required power based on the transmitted generator power generation command. In addition, a battery control determining part 43 determines whether or not power is lacking by comparing a actual power generation amount of the generator 3, which is input via the platform 31, with the power feed control requiring power generation amount from the power feed control requiring power generation amount determining part 40, and if it is determined that the power is lacking, restricts feeding of power to the electric components depending on priority of the electric components. The priority of each of the electric components will be described later.

Next, operations of the functional parts of the power control apparatus 1 will be described with reference to the block diagram of FIG. 1 and a flow chart of FIG. 3.

The CPU 11 of the power control apparatus 1 executes a power generation control program shown in FIG. 3 every 16 ms. When this program is executed, first, the battery conditions such as the charging rate, the internal resistance and the like of the battery 2 based on the detected outputs such as the voltage, current, battery solution temperature and the like of the battery 2 are detected and then stored in the RAM 13 (Step 101). Thereafter, the vehicle situation information such as the engine RPM, the shift situation, the accelerator opening rate and so on from the sensors 9 is detected (Step 102), and then the running mode such as acceleration, deceleration, idling, constant speed and the like is determined based on the detected vehicle situation information and then stored in the RAM 13 (Step 103).

Next, the CPU 11 detects the power consumption of the electric components, that is, the electric component power using amount, based on the starting states and driving states of the electric components 4, 5, 6 and then stores the detected power consumption in the RAM 13 (Step 104). Thereafter, the CPU 11 determines the feeding indispensable power based on the running mode stored in the RAM 13 and a table which is stored in the ROM 12 and indicates whether or not power is fed to the electric components, and stores the determined feeding indispensable power in the RAM 13 (Step 105).

FIG. 4 shows an example of a table indicating a relationship between the running mode and whether or not power is fed to the electric components. In this example, whether or not the power is fed to the electric components such as a pre-crash system (PCS), an anti-brake system (ABS), an airbag system (AXB), a skidding prevention system (VSC, vehicle stability control) and the like is set depending on the running mode such as acceleration, deceleration, idling, constant speed and the like. For example, for idling, feeding of power to the pre-crash system (PCS) is unnecessary, and accordingly, the battery requiring power generation amount is composed of power to be used by the airbag system (AXB).

Figures 5A, 5B, 6:
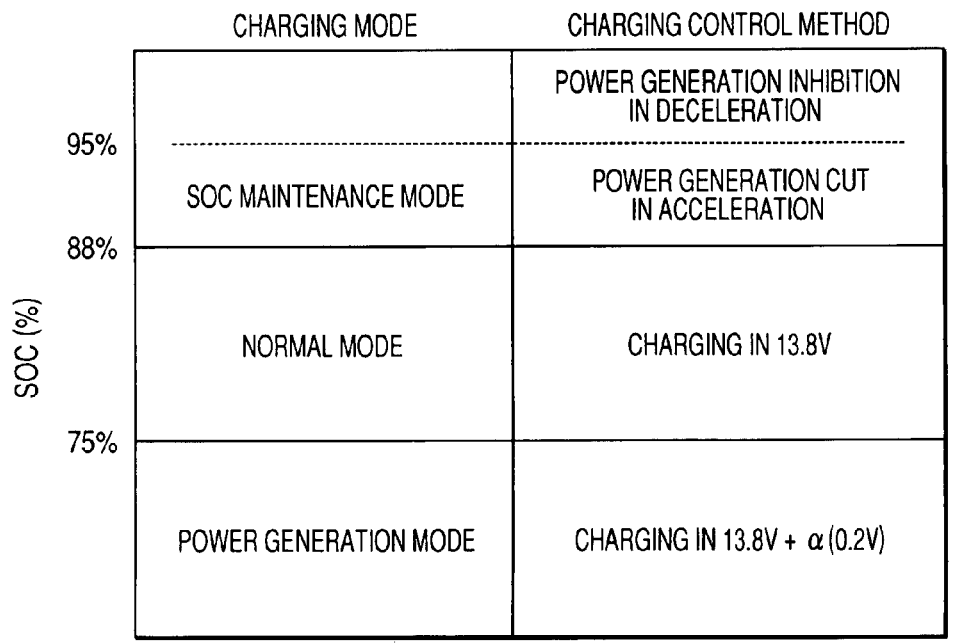
FIGS. 5(A) and 5(B) show an example of calculation of the amount of required power generation.
FIG. 6 is a table showing a relationship between a charging rate, a charging mode and a charging control method.

In the related-art control, since the feeding indispensable power is fixed irrespective of the running mode, if the power used by the electric components is 1.2 KW, the feeding indispensable power is 0.6 KW, and the battery charging requiring amount is 1.2 KW, the amount of required power generation in a generator is 3 KW, as shown in FIG. 5(A). However, as described above, in this embodiment, by changing the feeding indispensable power depending on the running mode, for example since the feeding indispensable power for idling is 0.2 KW, which is the power for only the airbag system, the power generation required amount can be reduced to 2.6 KW, as shown in FIG. 5(B), thereby allowing power generation cut of 0.4 KW, as compared to the related-art control, and hence preventing decrease of fuel efficiency due to increase of the amount of power generation.

After determining the feeding indispensable power, the CPU 11 determines the charging mode based on the charging rate (SOC) of the battery 2 stored in the RAM 13 and stores the determined charging mode in the RAM 13 (Step 106). For example, as shown in FIG. 6, the CPU 11 sets the charging mode to be a power generation mode if the charging rate is less than 76%, a normal mode if the charging rate is between 75% and 88%, and a SOC maintenance mode if the charging rate is more than 88%, and then stores the set charging mode in the RAM 13.

Next, the CPU 11 determines the charging control method based on the charging mode and running mode stored in the RAM 13 and based on whether or not power generation cut is required in acceleration of the vehicle depending on driver's drive characteristic or a setting by the driver (Step 107). Thereafter, the CPU 11 determines the battery requiring power generation amount based on the charging rate of the battery 2 and the charging control method, which are stored in the RAM 13, and stores the determined battery requiring power generation amount in the RAM 13 (Step 108).

For example, as shown in FIG. 6, in the power generation mode, the battery requiring power generation amount is calculated according to the charging rate of the battery 2 and the battery 2 is charged to a voltage of (13.8 V+α). Similarly, in the normal mode, the battery requiring power generation amount is calculated according to the charging rate of the battery 2 and the battery 2 is charged to a voltage of 13.8 V. In addition, in the SOC maintenance mode, the battery requiring power generation amount is calculated according to the charging rate of the battery 2. In this mode, the power generation is cut if the running mode is an acceleration mode and the battery 2 is charged with the charging rate of more than 95%, while the power generation is inhibited if the running mode is a deceleration mode.

In addition, in case of driveability preference by the driver's drive characteristic or the setting by the driver, that is, if the power generation is instructed to be cut in the acceleration, the battery requiring power generation amount is determined so that the power generation is always cut if the running mode is the acceleration mode.

After the battery requiring power generation amount is determined, the CPU 11 determines the power feed control require power generation amount based on the feeding indispensable power and the electric component power using amount stored in the RAM 13 (Step 109), determines the power generation amount of the generator 3 based on the power feed control requiring power generation amount and the battery requiring power generation amount, and transmits the generator power generation command signal to the generator 3 via the communication line 7 (Step 110). Here, the generator 3 generates required power based on the transmitted generator power generation command.

In addition, when the power generation is cut, battery dischargeable power is calculated as (current charging rate–discharge stop capacity)/100 battery capacity. For example, as shown in FIG. 7(A), in the driveability preference, if the electric component using power is 1.2 KW, the feeding indispensable power is 0.6 KW, and the battery chargeable/dischargeable power is 1.6 KW, since the power generation required amount is 0.2 KW, it is possible to accelerate a torque of the engine. In addition, in the battery charging preference, since the power generation is not required to be cut, as shown in FIG. 7(B), if the electric component using power is 1.2 KW and the feeding indispensable power is 0.6 KW, the power generation required amount is 1.8 KW.

After the power generation amount of the generator 3 is determined, the CPU 11 acquires the power generation amount of the generator 3 input via the communication line 7 (Step 111) and determines whether or not the power is lacking by comparing the power feed control requiring power generation amount determined in Step 109 with the power generation amount of the generator 3. If it is determined that the power is lacking, feeding of power to the electric components is restricted according to the power using priority of the electric components (Step 112), and then the program is terminated.

FIG. 8 shows an example of a table indicating using priority and power consumption data of the electric components, which are stored in the ROM 12. In this example, using priority and required power (W) according to levels of operation states for the electric components are stored in the table. In the electric components, some electric components change required power in accordance with levels of operation states. For example, air conditioner changes required power in accordance with air blasting amount. When performing a load control, the CPU 11 determines a load restriction unit based on the priority and the required power (W). For example, if the lacking power is 60 W, a load of a massage chair is restricted. If the massage chair is not used, a load restriction determination is made for a unit having lower priority.

As described above, by changing the feeding indispensable power depending on the running mode, since the power generation required amount can be determined with the minimum feeding indispensable power, it is possible to prevent fuel efficiency from being decreased due to an increase of the power generation amount.

In the first embodiment, although the feeding indispensable power is defined as power required when the electric components which are related to the safety system are activated, power required when a predetermined electric component (such as electric power steering, light, wiper, air conditioner, audio-visual equipment) not related to the safety system is activated may be included in the feeding indispensable power. Namely, power consumed by the electric components which are currently activated in the vehicle mounted electric components may be the electric components using power, and power required in a case where the electric components which are not currently activated become activated may be the feeding indispensable power.

In the first embodiment, the feeding indispensable power is determined by the feeding indispensable power determining part 35 depending on the running mode of the vehicle. However, the feeding indispensable power determined by the feeding indispensable power determining part 35 may be changed by, for example, the power feed control requiring power generation amount determining part 40 or generator power generation amount determining part 42 depending on the running mode of the vehicle.

Second Embodiment

Although, in the first embodiment, a power generation command value of the generator is determined based on various information detected in real time, the power generation command value of the generator may be adjusted by predicting the transition of parameters related to the power generation control for each area based, for example, on information from a car navigation apparatus, and comparing the power generation command value of the generator determined based on various information detected in real time with an ideal power generation command value calculated based on a result of the prediction.

Hereinafter, an embodiment in which the power generation command value of the generator is adjusted based on the ideal power generation command value for each area and the power generation command value determined based on the various information detected in real time will be described.

Figure 9:
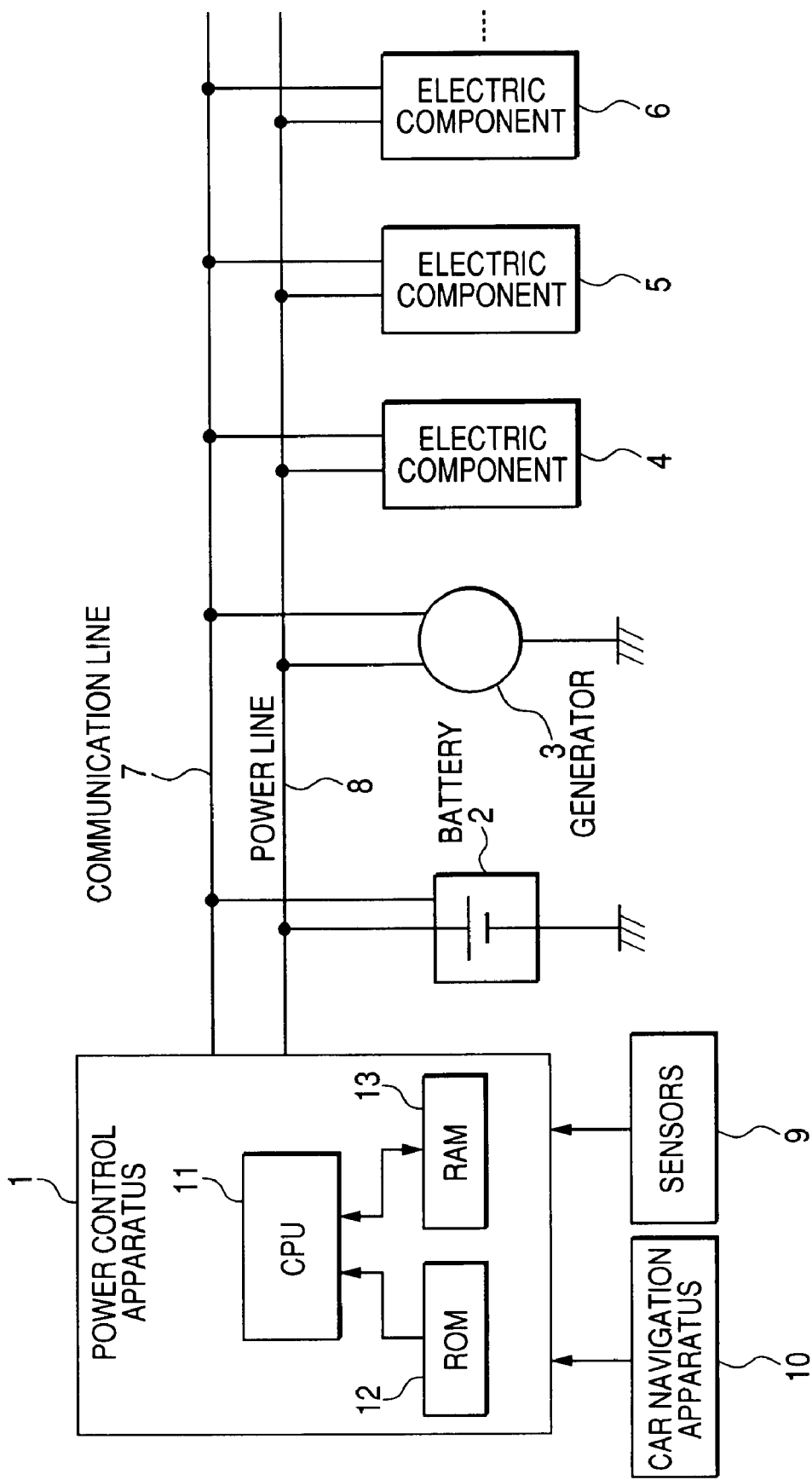
FIG. 9 is a block diagram showing a configuration of a power control system including a power control apparatus according to a second embodiment of the invention.

FIG. 9 is a block diagram showing a configuration of a power control system including a power control apparatus according to a second embodiment of the invention. The power control system of the second embodiment has the same configuration as the power control system of the first embodiment except that a car navigation apparatus 10 as an external information detecting unit is added to the power control apparatus 1 shown in FIG. 1, and therefore, explanation of which will be omitted. In addition, the car navigation apparatus 10 inputs, as the parameters related to the power generation control, external information such as road information, weather information, required time and the like to destination of a vehicle to the power control apparatus 1.

Figure 10:
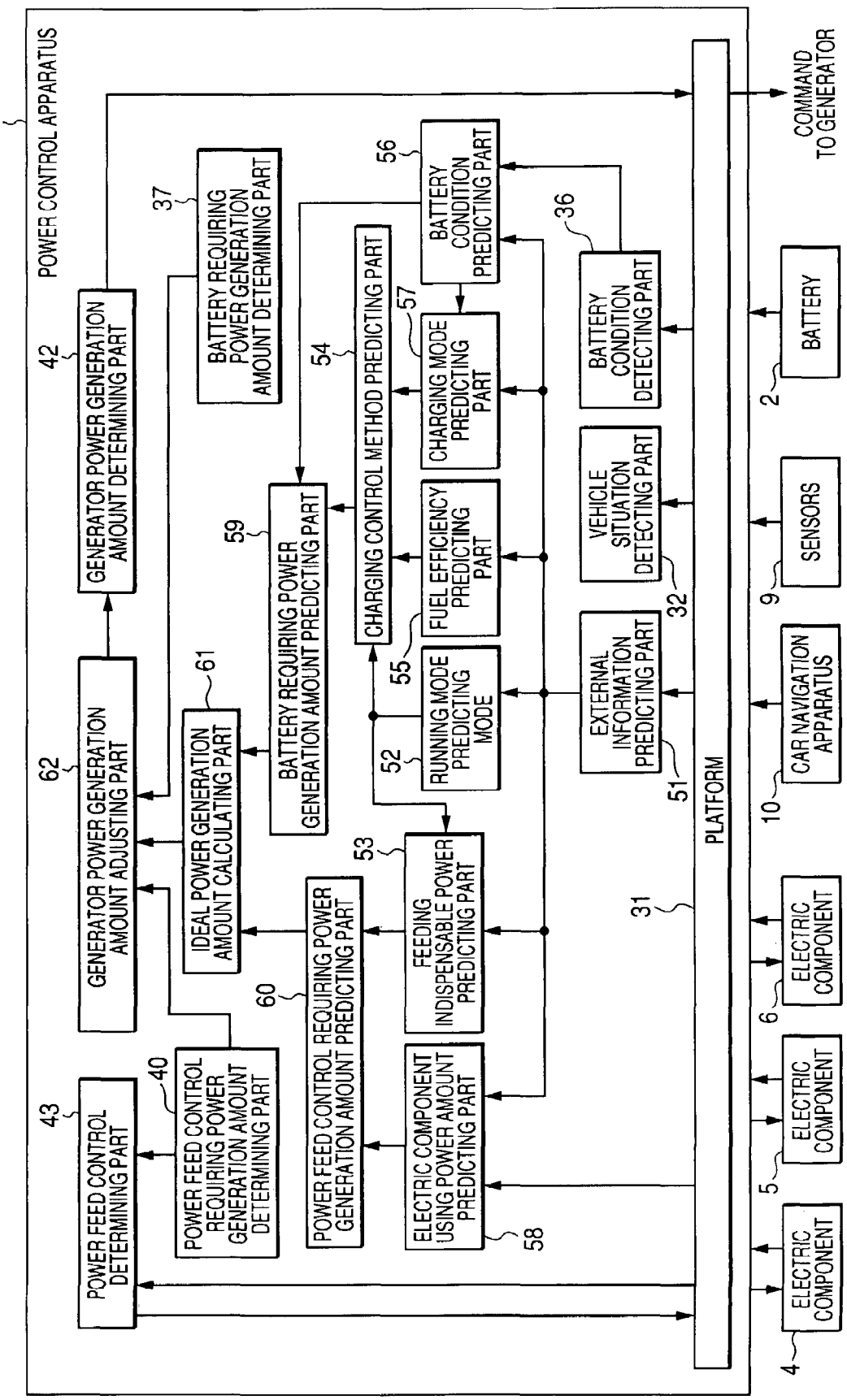
FIG. 10 is a functional block diagram showing a functional configuration of the power control apparatus according to the second embodiment.

FIG. 10 is a functional block diagram showing a functional configuration of the power control apparatus 1 according to the second embodiment. Each of components of the power control apparatus 1 includes the CPU 11, the ROM 12 and the RAM 13 and their functions are performed by software.

In addition, in FIG. 10, the functional parts denoted by the same reference numerals as in FIG. 1 have the same functions as the functional parts of FIG. 1, and therefore, those explanations will be omitted.

An external information detecting part 51 acquires the external information such as road information, weather information, required time and the like for each area to destination of the vehicle based on the information from the car navigation apparatus 10, and provides the acquired external information to a running mode predicting part 52, a feeding indispensable power predicting part 53, a fuel efficiency predicting part 55, a battery condition predicting part 56, a charging mode predicting part 57, and an electric component power using amount predicting part 58. Here, the each area can be preliminarily and arbitrarily set as, for example, distance of 5 km, distance between nodes, distance between intersections.

The running mode predicting part 52 predicts a running mode for each area based on the external information from the external information detecting part 51 and informs the feeding indispensable power predicting part 53 and a charging control method predicting part 54 of the predicted running mode. The fuel efficiency predicting part 55 predicts fuel efficiency for each area based on the external information from the external information detecting part 51 and provides the predicted fuel efficiency to the charging control method predicting part 54. The battery condition predicting part 56 predicts a battery charging rate for each area based on the external information from the external information detecting part 51 and a current battery condition input from the battery condition detecting part 36 and provides the predicted battery charging rate to the charging mode predicting part 57 and a battery requiring power generation amount predicting part 59. The charging mode predicting part 57 predicts a charging mode for each area based on the charging rate for each area input from the battery condition predicting part 56, and inputs the predicted charging mode to the charging control method predicting part 54.

The charging control method predicting part 54 determines a charging control method for each area based on the running mode for each area informed from the running mode predicting part 52, the charging mode for each area informed from the charging mode predicting part 57 and the fuel efficiency for each area informed from the fuel efficiency predicting part 55, and inputs the determined charging control method to the battery requiring power generation amount predicting part 59. The battery requiring power generation amount predicting part 59 determines the battery requiring power generation amount for each area based on the charging rate of the battery 2 for each area input from the battery condition predicting part 56 and the charging control method for each area input from the charging control method predicting part 54.

The feeding indispensable power predicting part 53 predicts the feeding indispensable power for each area based on the information from the external information detecting part 51 and the running mode for each area informed from the running mode predicting part 52, and provides the predicted feeding indispensable power to a power feed control requiring power generation amount predicting part 60. The electric component power using amount predicting part 58 predicts the electric component power using amount for each area based on the information from the external information detecting part 51 and a current electric component use condition and provides the predicted electric component power using amount to the power feed control requiring power generation amount predicting part 60. The power feed control requiring power generation amount predicting part 60 predicts the power feed control requiring power generation amount for each area based on the feeding indispensable power for each area from the feeding indispensable power predicting part 53 and the electric component power using amount for each area from the electric component power using amount predicting part 58 and outputs the predicted power feed control requiring power generation amount to an ideal power generation amount calculating part 61.

The ideal power generation amount calculating part 61 calculates the ideal power generation amount for each area based on the battery requiring power generation amount for each area from the battery requiring power generation amount predicting part 59 and the power feed control requiring power generation amount for each area from the power feed control requiring power generation amount predicting part 60 and outputs the calculated ideal power generation amount to a generator power generation amount adjusting part 62. The generator power generation amount adjusting part 62 determines the power generation amount of the generator based on a difference between the sum of the power feed control requiring power generation amount determined by various information detected in real time from the power feed control requiring power generation amount determining part 40 and the battery requiring power generation amount determined by various information detected in real time from the battery requiring power generation amount determining part 37 and the ideal power generation amount from the ideal power generation amount calculating part 61 and inputs the determined power generation amount of the generator to the generator power generation determining part 42.

Next, operations of the functional parts of the power control apparatus 1 will be described with reference to the block diagram of FIG. 9 and flow charts of FIGS. 11 and 13.

Figure 11:
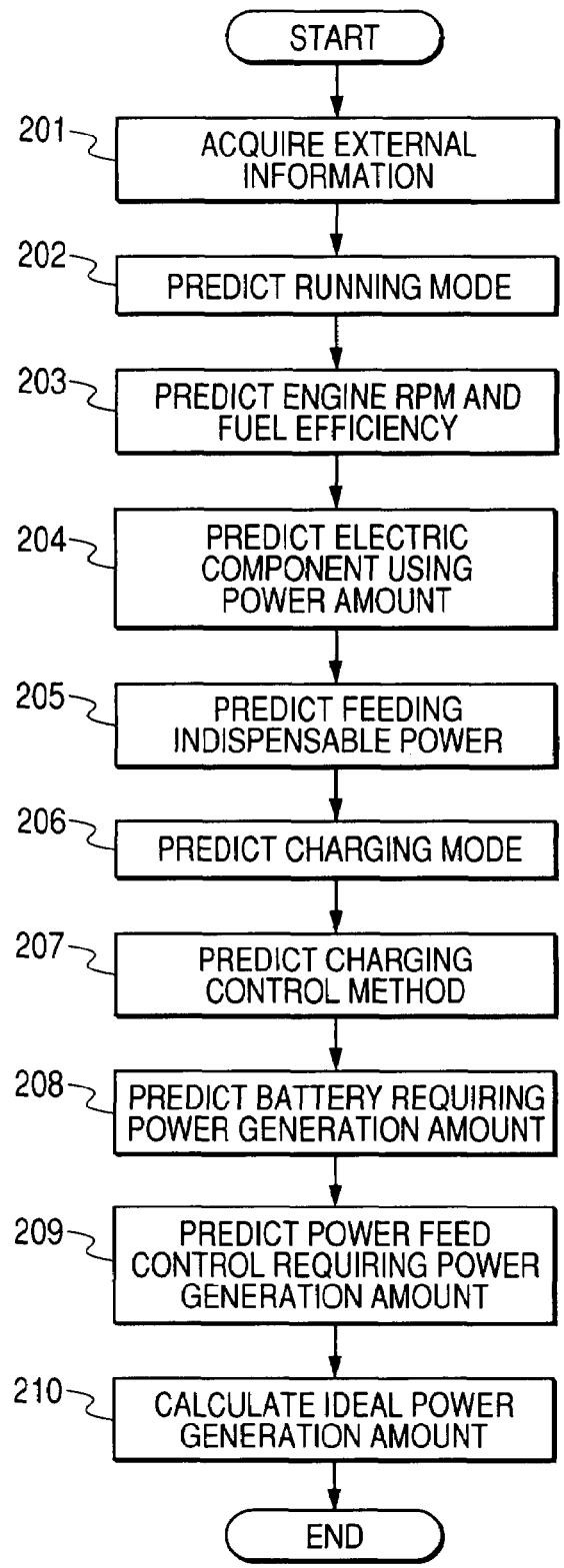
FIG. 11 is a flow chart illustrating a process of calculating the ideal amount of power generation.

The flow chart of FIG. 11 shows an operation of a program of predicting the transition of parameters related to the power generation control for each area based on the information from the car navigation apparatus 10 and calculating an ideal power generation command value based on the predicting result. The CPU 11 of the power control apparatus 1 executes an ideal power generation amount calculating program shown in FIG. 11 every predetermined time, for example, every ten minutes. When this program is executed, first, external information such as road information, weather information, required time and the like to destination of the vehicle are acquired based on information from the car navigation apparatus 10 (Step 201). Accordingly, as shown in FIG. 12(A), road information such as straight line, curve, upward slope and the like for each area, weather conditions, required time for each area to the destination of the vehicle are stored in the RAM 13.

Next, the CPU 11 predicts the running mode for each area based on the information for each area (Step 202), as shown in FIG. 12(B), and then, predicts the engine RPM and the fuel efficiency for each area based on the information for each area and the predicted running mode (Step 203), as shown in FIGS. 12(C) and 12(D) and predicts the electric component power using amount for each area (Step 204). For example, as shown in FIG. 12(E), air conditioner ON/OFF, electric power steering ON/OFF, wiper or light ON/OFF and so on are predicted based on external information.

Next, the CPU 11 predicts the feeding indispensable power for each area based on the running mode for each area and a table that is stored in the ROM 12 and indicates whether or not power is fed to the electric components, as shown in FIG. 12(F), and stores the predicted feeding indispensable power for each area in the RAM 13 (Step 205). Thereafter, the CPU 11 predicts the battery conditions for each area based on the charging rate of the battery 2, and the engine RPM and the electric component power using amount which are predicted for each area, as shown FIG. 12(G), and stores the predicted battery conditions in the RAM 13. In addition, the CPU 11 predicts the charging mode for each area based on the battery conditions for each area, as shown in FIG. 12(H), and stores the predicted charging mode in the RAM 13 (Step 206).

After predicting the charging mode for each area, the CPU 11 predicts the charging control method for each area based on the charging mode, the running mode and the fuel information for each area and stores the predicted charging control method in the RAM 13 (Step 207). Next, the CPU 11 predicts the battery requiring power generation amount for each area based on the battery conditions and the charging control method for each area stored in the RAM 13 (Step 208). Next, the CPU 11 predicts the power feed control requiring power generation amount for each area based on the feeding indispensable power and the electric component power using amount for each area stored in the RAM 13 (Step 209). Next, the CPU 11 calculates the ideal power generation amount for each area based on the power feed control requiring power generation amount for each area and the battery requiring power generation amount for each area and stores the calculated ideal power generation amount for each area in the RAM 13 (Step 210).

On the other hand, although the CPU 11 of the power control apparatus 1 executes the power feed control program shown in FIG. 13 every 16 ms, Steps 301 to 311 have the same operation as Steps 101 to 110 of the flow chart shown in FIG. 3 except for acquiring a running position at that time from the car navigation apparatus 10, and therefore, explanation of which will be omitted and Steps after Step 311 will be described.

As shown in FIG. 12(J), the CPU 11 determines the power generation amount of the generator 3 based on the power feed control requiring power generation amount and the battery requiring power generation amount and stores the determined power generation amount in the RAM 13 (Step 311). Next, the CPU 11 reads the ideal power generation amount from the RAM 13 based on the running position acquired in Step 303 (Step 312). Next, the CPU 11 compares the power generation amount with the ideal power generation amount to determine whether or not a difference between the power generation amount and the ideal power generation amount exceeds a predetermined value (Step 313). If it is determined that the difference between the power generation amount and the ideal power generation amount exceeds the predetermined value, as shown in FIG. 12(K), the CPU 11 corrects the power generation amount according to a predetermined ratio of the difference between the power generation amount and the ideal power generation amount (Step 314). Next, the CPU 11 sets the corrected power generation amount, or the non-corrected power generation amount if it is determined that the difference between the actual power generation amount and the ideal power generation amount does not exceed the predetermined value, to be the power generation amount of the generator, and instructs the generator 3 to execute a power generation command via the communication line 7 (Step 315). Here, the generator 3 generates required power based on the transmitted power generation command.

Next, the CPU 11 acquires the power generation amount of the generator 3 input via the communication line 7 (Step 316). Next, the CPU 11 compares the power feed control requiring power generation amount with the power generation amount of the generator 3 to determine whether or not power is lacking. If it is determined that the power is lacking, the CPU 11 restricts feeding of battery power to the electric components according to using priority of the electric components (Step 317), and then the program is terminated.

As described above, by predicting the transition of parameters related to are charging control for each area based on the information from the external information detecting unit such as the car navigation apparatus, a future running mode and so on are anticipated to predict the ideal power generation amount and by correcting the power generation amount determined based on various information detected in real time based on the difference between the power generation amount and the predicted ideal power generation amount, disability of power feed and decrease of fuel efficiency can be reliably prevented.

Third Embodiment

In addition, by detecting driver's characteristic based on vehicle information such as a vehicle speed or an accelerator opening rate, electric component use situation and the like and correcting expected amount of the vehicle speed, the acceleration opening rate, the electric component using power and the like based on the detected driver's characteristic, it is possible to increase anticipated precision of the ideal power generation amount. Hereinafter, an embodiment in which the expected amount is corrected based on the driver's characteristic will be described.

In the third embodiment, a power control system including the power control apparatus 1 has the same configuration as the power control system shown in FIG. 9, and therefore, explanation of which will be omitted.

Figure 14:
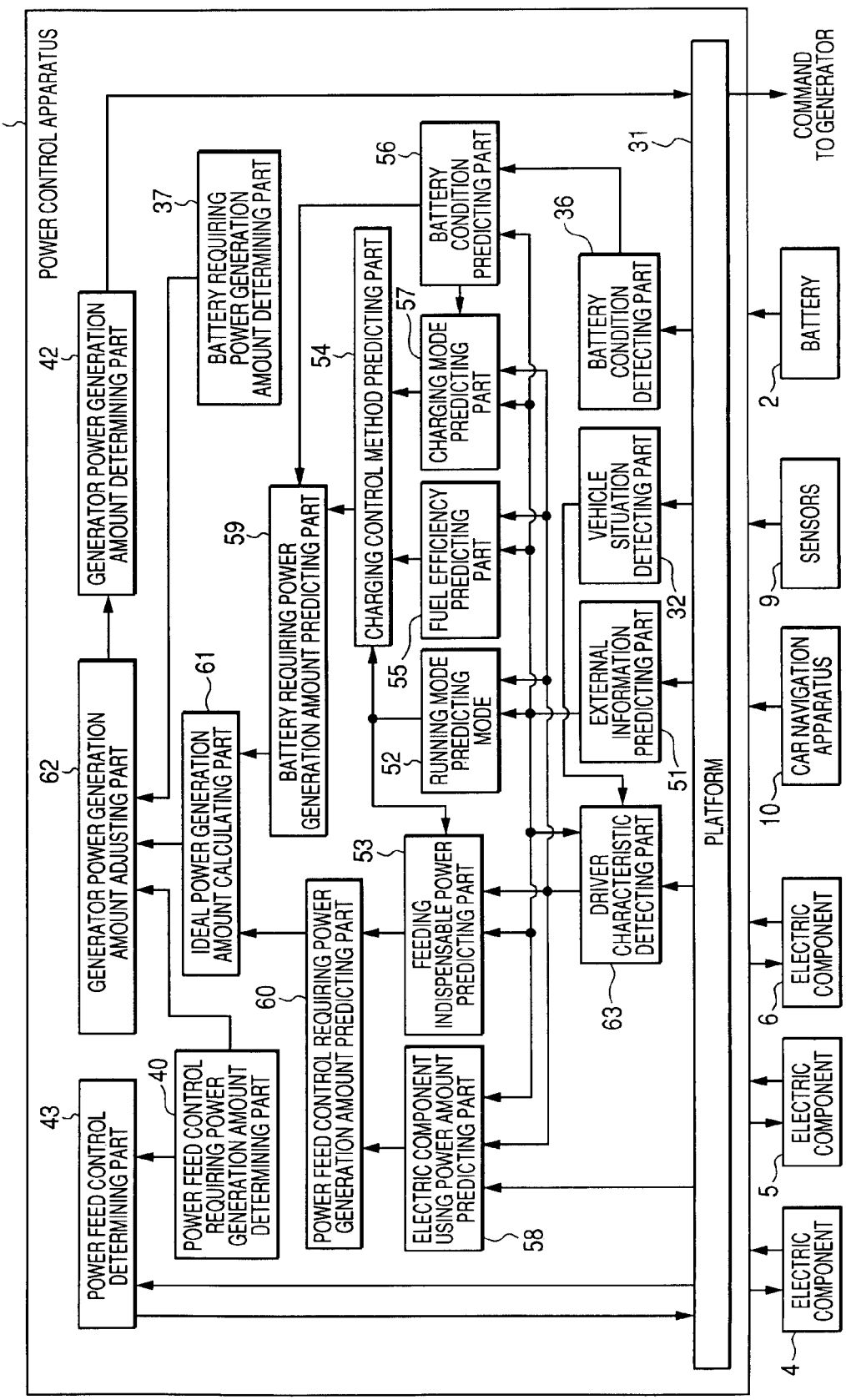
FIG. 14 is a functional block diagram showing a functional configuration of a power control apparatus according to a third embodiment of the invention.

FIG. 14 is a functional block diagram showing a functional configuration of the power control apparatus 1 according to the third embodiment of the invention. Each of components of the power control apparatus 1 includes the CPU 11, the ROM 12 and the RAM 13 and their functions are performed by software. In FIG. 14, the functional parts denoted by the same reference numerals as in FIG. 10 have the same functions as the functional parts of FIG. 10, except a driver characteristic detecting part 63, and therefore, explanation of which will be omitted.

The driver characteristic detecting part 63 determines driver's characteristic, for example, drive characteristic such as "normal type," "sports type" that frequently uses an accelerator and a brake, "economy type" that does not speed up, etc. or an electric component using habit, etc., based on road information such as curve, straight line and the like acquired from the navigation apparatus 10, brake or accelerator use situation and electric component use situation acquired from the vehicle situation detecting part 32.

Figure 15:
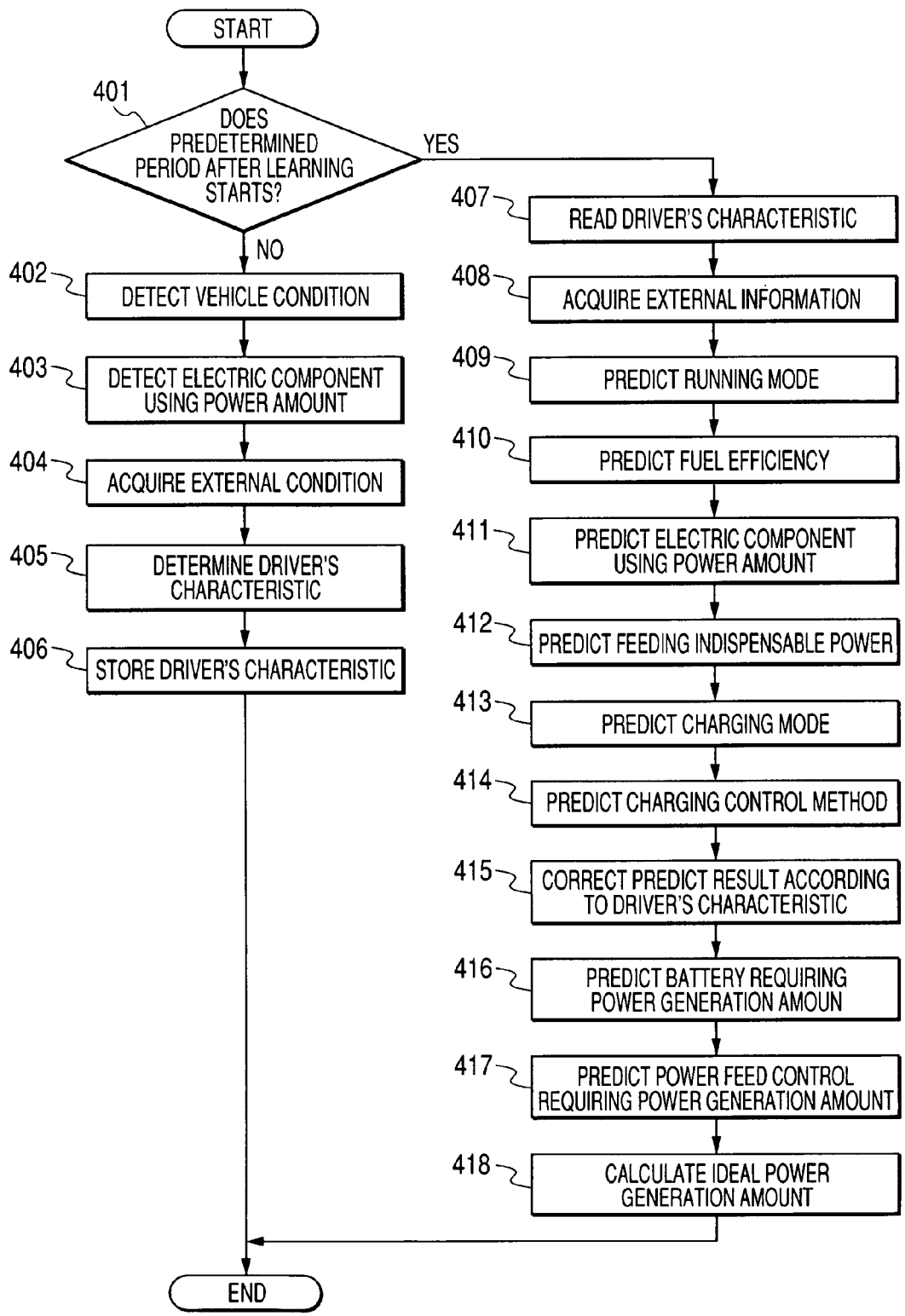
FIG. 15 is a flow chart illustrating a process of performing learning for driver characteristic.

Next, a process of performing learning for the driver's characteristic will be with reference to a flow chart of FIG. 15.

The CPU 11 of the power control apparatus 1 executes an ideal power generation amount calculating program shown in FIG. 15 every ten minutes. When this program is executed, first, the CPU 11 determines whether or not a predetermined period, for example, one month, elapses after learning starts (Step 401). If it is determined that the predetermined period dos not elapse after the learning starts, the CPU 11 detects information such as shift situation, brake use situation, acceleration opening rate and the like from various sensors 9 and stores the detected information in the RAM 13 (Step 402). Next, the CPU 11 detects electric component use situation based on starting and driving states of the electric components 4, 5, 6 and stores the detected electric component use situation in the RAM 13 (Step 403).

Next, the CPU 11 acquires road information such as curve, straight line and the like and weather conditions from the car navigation apparatus 10 and stores the acquired road information and weather conditions in the RAM 13 (Step 404). Next, the CPU 11 determines the driver's characteristic based on the pre-stored road information and brake or accelerator use situation and determines the electric component using habit of the driver depending on the road and weather conditions based on the electric component use situation (Step 405), and then stores the determined driver's characteristic and electric component using habit in the RAM 13 (Step 406).

On the other hand, if it is determined in Step 401 that the predetermined period elapses after the learning starts, the CPU 11 reads the driver's characteristic from the RAM 13 (Step 407). In calculating the ideal power generation amount, in the third embodiment, Steps 408 to 414 and Steps 416 to 418 have the same operation as Steps 201 to 207 and Steps 208 to 210 of the flow chart shown in FIG. 11, respectively, and therefore, explanation of which will be omitted and only Step 415 will be described.

After predicting the charging control method in Step 414, the CPU 11 corrects prediction results of components based on the driver's characteristic (Step 415). For example, the running mode predicted in Step 409 is corrected based on the drivers characteristic. As another example, if the driver is of a sports type, acceleration and deceleration periods are corrected to be short, and if the driver is of an economy type, the acceleration and deceleration periods are corrected to be long. In addition, the electric component power using amount predicted in Step 411 is corrected based on the electric component using habit of the driver.

As described above, by correcting prediction values of the running mode and the electric component power using amount based on the driver's characteristic in calculating the ideal power generation amount, it is possible to increase anticipated precision of the ideal power generation amount, thereby reliably preventing disability of power feed and decrease of fuel efficiency.

Fourth Embodiment

In the above described second embodiment, the ideal power generation amount may be predicted based on the current electric component using power and prediction of change of the electric component using power in future. Hereinafter, an embodiment in which the ideal power generation amount is predicted based on the current electric component using power and prediction of change of the electric component using power in future will be described.

A configuration of a power control system including a power control apparatus according to a fourth embodiment of the invention is the same as FIG. 9, and therefore, explanation of the configuration win be omitted.

Figure 19:
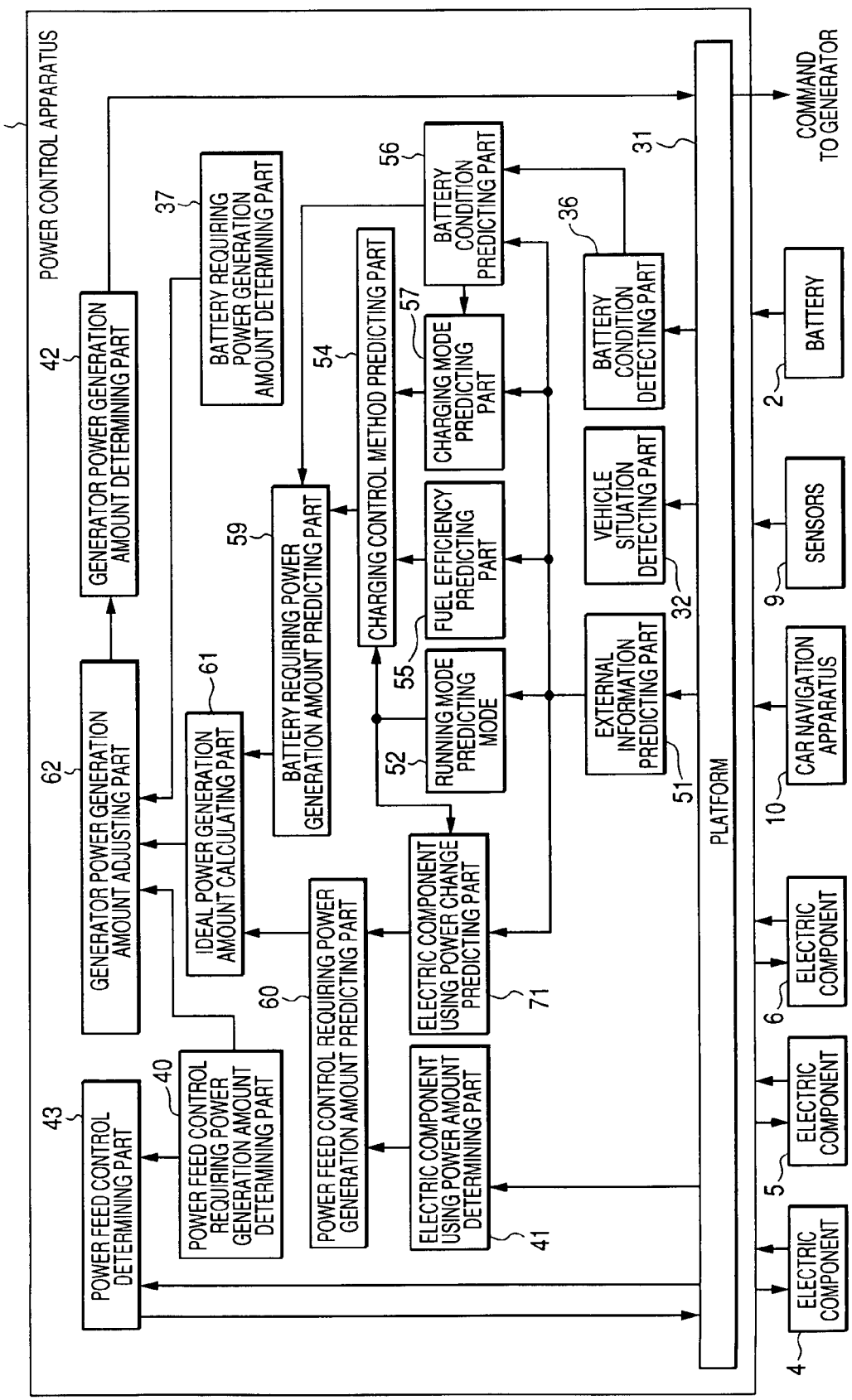
FIG. 19 is a functional block diagram showing a functional configuration of a power control apparatus according to a fourth embodiment of the invention.

FIG. 19 is a functional block diagram showing a functional configuration of the power control apparatus 1 according to the fourth embodiment of the invention. Each of components of the power control apparatus 1 includes the CPU 11, the ROM 12 and the RAM 13 and their functions are performed by software.

In FIG. 19, the functional parts denoted by the same reference numerals as in FIGS. 2 and 10 have the same functions as the functional parts of FIGS. 2 and 10, and therefore, explanation of which will be omitted.

An electric component using power change predicting part 71 predicts the change of the electric component using power for each area based on information from the external information detecting part 51 and the predicted running mode for each area notified by the running mode prediction part 52, and supplies the predicted change to the requiring power generation amount predicting part 60. Here the electric components, the power consumptions of which are predicted by the electric component using power change predicting part 71 may be all of the electric components mounted on the vehicle, the electric components related to the safety system, or the predetermined electric components. The requiring power generation amount predicting part 60 predicts the power feed control requiring power generation amount for each area based on the current electric component using power from the electric component using power determining part 41 and predicted change of the electric component using power for each area from the electric component using power change predicting part 71, and output the power feed control requiring power generation amount to the ideal power generation amount calculating part 61.

Next, operations of the functional parts of the power control apparatus 1 will be described with reference to flow chart of FIG. 20.

Figure 20:
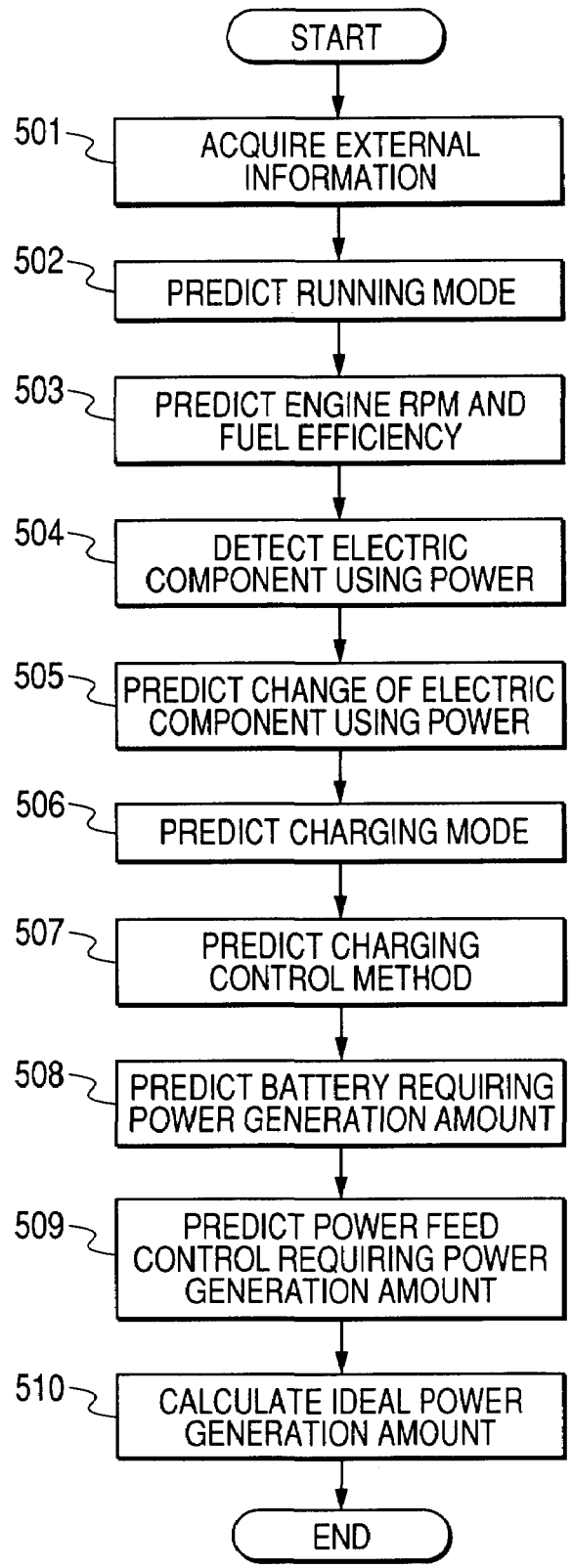
FIG. 20 is a flow chart illustrating an operation of the power control apparatus shown in FIG. 19.

The flow chart of FIG. 20 shows an operation of a program which predicts the change of the electric component using power based on the information from the car navigation apparatus 10, and calculates the ideal power generation command value based on the predicting result and the current electric component using power. The CPU 11 of the power control apparatus 1 executes an ideal power generation amount calculating program shown in FIG. 20 every predetermined time, for example, every ten minutes. Operations of Steps 501 to 503 and operations of Steps 506 to 510 are the same as operations of Steps 201 to 203 and operations of Steps 206 to 210 which are shown in FIG. 11, and therefore, explanation of which will be omitted and Steps 504 and 505 will be described.

The CPU 11 detects the electric component using power which is power consumed by the electric components which is currently activated (Step 504). Namely, as shown in FIG. 21(E), the CPU 11 detects air conditioner ON/OFF, electric power steering ON/OFF, wiper or light ON/OFF. Next, as shown in FIG. 21(F), the CPU 11 predicts the change of the electric component using power for each area based on the running mode for each area and the external information, and stores the predicted change in the RAM 13 (Step 505).

As described above, since accuracy of the predicted ideal power generation amount can be increased by predicting the change of the electric component using power when the ideal power generation amount is calculated, disability of power feed to all of the electric components mounted on the vehicle and decrease of fuel efficiency can be reliably prevented.

Fifth Embodiment

In the above described fourth embodiment, as explained in the third embodiment, the predicting result of change of the electric component using power can be corrected depending on the driver's characteristic.

Figure 22:
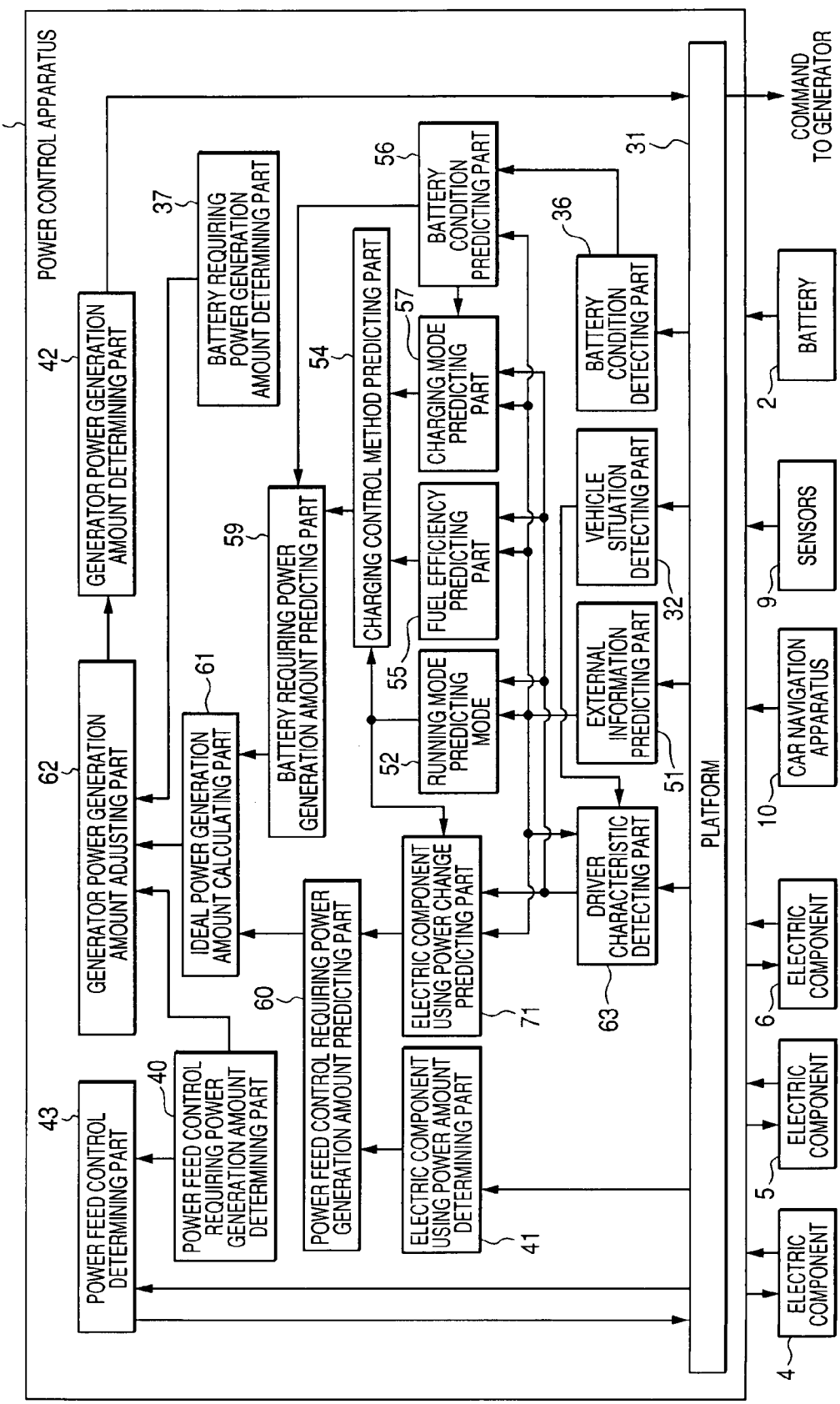
FIG. 22 is a functional block diagram showing a functional configuration of a power control apparatus according to a fifth embodiment of the invention.

FIG. 22 is a functional block diagram showing a functional configuration of the power control apparatus 1 in the fifth embodiment of the invention. The driver characteristic detecting part 63 as explained in FIG. 14 is further included in the block diagram of FIG. 19. In FIG. 22, the functional parts denoted by the same reference numerals as in FIGS. 14 and 19 have the same functions as the functional parts of FIGS. 14 and 19, and therefore, explanation of which will be omitted.

The electric component using power change predicting part 71 predicts the change of the electric component using power for each area based on information from the external information detecting part 51 and the predicted running mode for each area notified by the running mode prediction part 52, corrects the predicted change by the driver characteristic from the driver characteristic detecting part 63, and supplies the predicted corrected change to the requiring power generation amount predicting part 60.

As described above, since accuracy of the predicted ideal power generation amount can be increased by correcting the predicted change of the electric component using power or the running mode when the ideal power generation amount is calculated, disability of power feed to all of the electric components mounted on the vehicle and decrease of fuel efficiency can be reliably prevented.

[FIG. 1]
1: power control apparatus
11: CPU
12: ROM
13: RAM
9: sensors
7: communication line
8: power line
2: battery
3: generator
4: electric component
5: electric component
6: electric component

[FIG. 2]
1: power control apparatus
43→31: power feed restriction
31→43: power generation amount
43: power feed control determining part
42: generator power generation amount determining part
40: power feed control requiring power generation amount determining part
37: battery requiring power generation amount determining part
41: electric component using power amount determining part
35: feeding indispensable power determining part
33: running mode determining part
32: vehicle situation detecting part
34: charging control method determining part
38: charging mode determining part
36: battery condition detecting part
39: power generation cut determining part
31: platform
4, 5, 6: electric component
9: sensors
2: battery
31→: command to generator

[FIG. 3]
Start
101: detect battery condition.
102: detect vehicle condition.
103: determine running mode.
104: detect electric component using power.
105: determine feeding indispensable power.
106: determine charging mode.
107: determine charging control method.
108: determine battery requiring power generation amount.
109: determine power feed control requiring power generation amount.
110: determine power generation amount.
111: acquire actual power generation amount.
112: determine whether or not power feed is restricted.
End

[FIG. 4]
Electric component\mode
acceleration,
constant speed,
deceleration,
idling

[FIG. 5]
(a) electric component using power
   feeding indispensable power
   battery charging requiring amount
   Sum of power generation required
(b) electric component using power
   feeding indispensable power
   battery charging requiring amount
   sum of power generation required

[FIG. 6]
charging mode
SOC maintenance mode
normal mode
power generation mode
charging control method
power generation inhibition in deceleration power generation cut in acceleration
charging in 13.8 V
charging in 13.8 V+α (0.2 V)

[FIG. 7]
electric component using power
feeding indispensable power
battery dischargeable power
power generation amount
(a) driveability preference
electric component using power
feeding indispensable power
power generation requiring amount
(b) battery charging preference

[FIG. 8]
unit name
Air conditioner
Light
Navigator
Seat heater
Massage chair
Mirror heater
De-fogger
priority
required power
Level 1, Level 2, Level 3

[FIG. 9]
1: power control apparatus
11: CPU
12: ROM
13: RAM
10: car navigation apparatus
9: sensors
7: communication line
8: power line
2: battery
3: generator
4, 5, 6: electric component

[FIG. 10]
1: power control apparatus
43: power feed control determining part
40: power feed control requiring power generation amount determining part
62: generator power generation amount adjusting part
42: generator power generation amount determining part
61: ideal power generation amount calculating part
60: power feed control requiring power generation amount predicting part
59: battery requiring power generation amount predicting part
58: electric component using power amount predicting part
54: charging control method predicting part
53: feeding indispensable power predicting part
52: running mode predicting mode
51: external information predicting part
55: fuel efficiency predicting part
32: vehicle situation detecting part
57: charging mode predicting part
36: battery condition detecting part
56: battery condition predicting part
37: battery requiring power generation amount determining part
31: platform
4, 5, 6: electric component
10: car navigation apparatus
9: sensors
2: battery
31→: command to generator

[FIG. 11]
Start
201: acquire external information.
202: predict running mode.
203: predict engine RPM and fuel efficiency.
204: predict electric component using power amount.
205: predict feeding indispensable power.
206: predict charging mode.
207: predict charging control method.
208: predict battery requiring power generation amount.
209: predict power feed control requiring power generation amount.
210: calculate ideal power generation amount.
End

Figure 12:
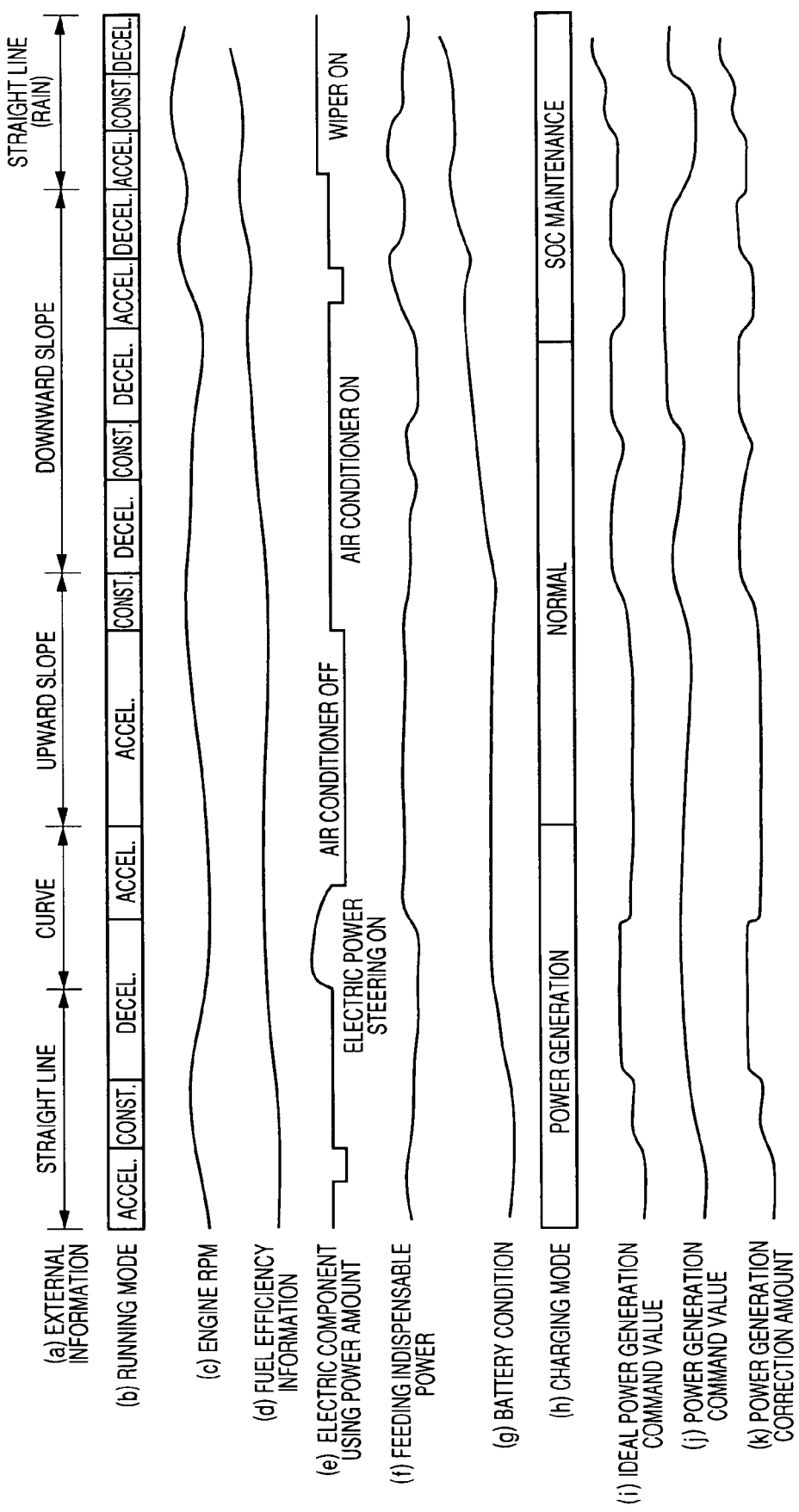
FIG. 12 is a view showing an example of parameters related to a power generation control, which are predicted based on external information.

[FIG. 12]
(a) external information
    Straight line,
    curve,
    upward slope,
    downward slope,
    straight line (rain)
(b) running mode
    accel.
    const.
    decel.
(c) engine RPM
(d) fuel efficiency information
(e) electric component using power amount
    Electric power steering ON
    Air conditioner OFF
    Air conditioner ON
    Wiper ON
(f) feeding indispensable power
(g) battery condition
(h) charging mode
    Power generation
    Normal
    SOC maintenance
(i) ideal power generation command value
(j) power generation command value
(k) power generation correction amount

Figure 13:
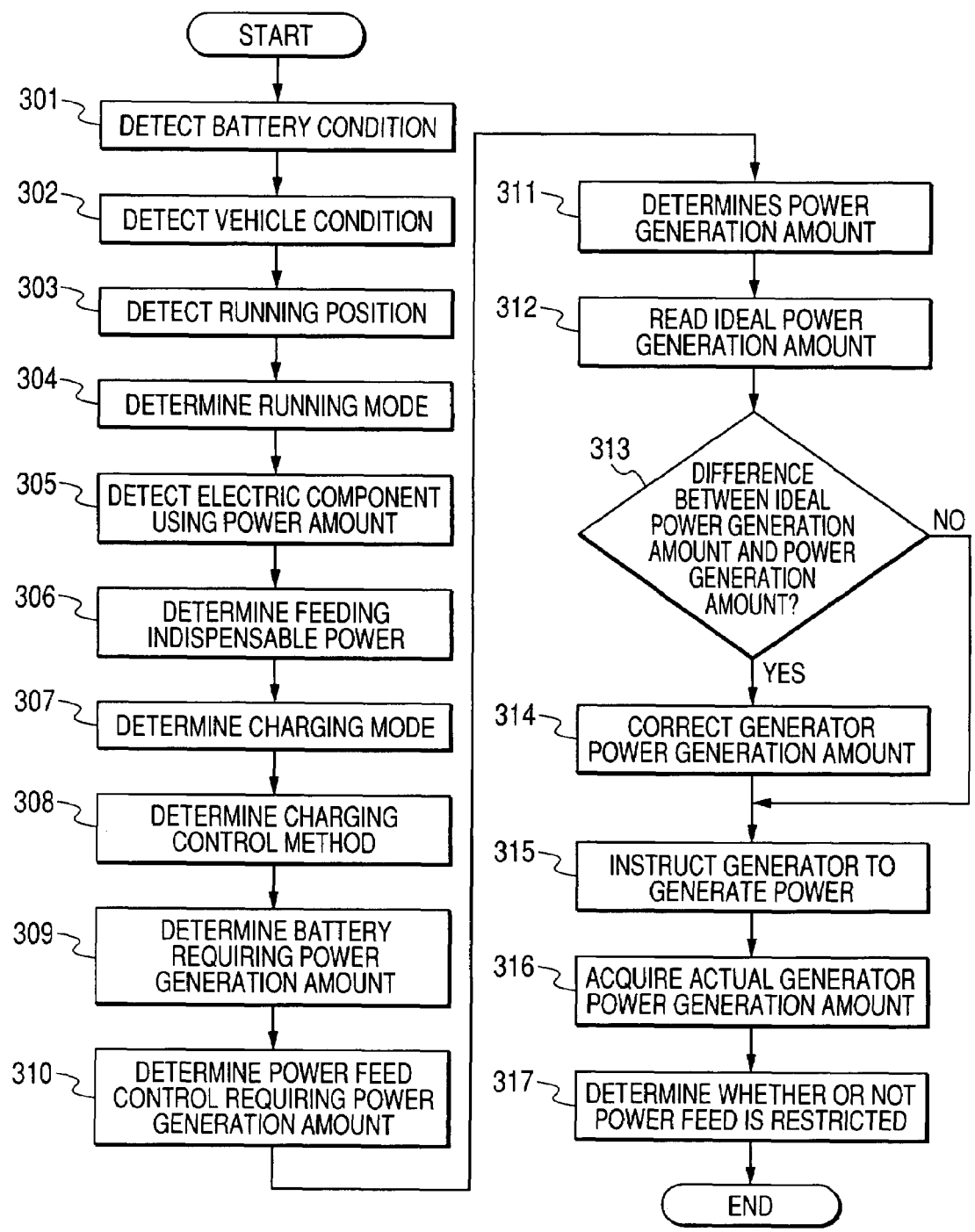
FIG. 13 is a flow chart illustrating an operation of the power control apparatus shown in FIG. 10.

[FIG. 13]
Start
301: detect battery condition.
302: detect vehicle condition.
303: detect running position.
304: determine running mode.
305: detect electric component using power amount.
306: determine feeding indispensable power.
307: determine charging mode.
308: determine charging control method.
309: determine battery requiring power generation amount.
310: determine power feed control requiring power generation amount.
311: determines power generation amount.
312: read ideal power generation amount.
313: difference between ideal power generation amount and power generation amount?
314: correct generator power generation amount.
315: instruct generator to generate power.
316: acquire actual generator power generation amount.
317: determine whether or not power feed is restricted.
End

[FIG. 14]
1: power control apparatus
43: power feed control determining part
40: power feed control requiring power generation amount determining part
62: generator power generation amount adjusting part
42: generator power generation amount determining part
61: ideal power generation amount calculating part
60: power feed control requiring power generation amount predicting part
59: battery requiring power generation amount predicting part
58: electric component using power amount predicting part
54: charging control method predicting part
53: feeding indispensable power predicting part
52: running mode predicting mode
51: external information predicting part
55: fuel efficiency predicting part
32: vehicle situation detecting part
57: charging mode predicting part
36: battery condition detecting part
56: battery condition predicting part
63: driver characteristic detecting part
37: battery requiring power generation amount determining part
31: platform
4, 5, 6: electric component
10: car navigation apparatus
9: sensors
2: battery
31→: command to generator

[FIG. 15]
Start
401: does predetermined period after learning starts?
402: detect vehicle condition.
403: detect electric component using power amount.
404: acquire external condition.
405: determine driver's characteristic.
406: store driver's characteristic.
407: read driver's characteristic.
408: acquire external information.
409: predict running mode.
410: predict fuel efficiency.
411: predict electric component using power amount.
412: predict feeding indispensable power.
413: predict charging mode.
414: predict charging control method.
415: correct predict result according to driver's characteristic.
208: predict battery requiring power generation amount.
209: predict power feed control requiring power generation amount.
210: calculate ideal power generation amount.
End

Figure 16:
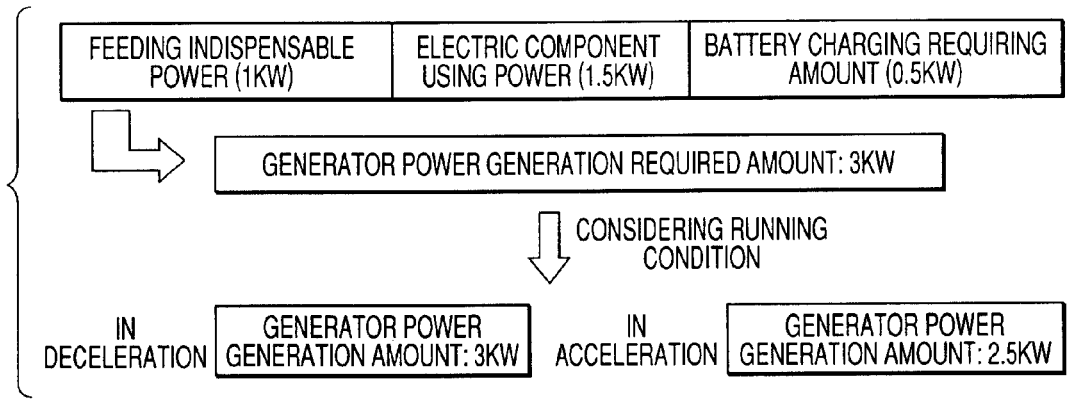
FIG. 16 is a view flow chart illustrating a power generation control method.

[FIG. 16]
feeding indispensable power
electric component using power
battery charging requiring amount
generator power generation required amount
considering running condition
in deceleration, generator power generation amount
in acceleration, generator power generation amount

Figure 17:
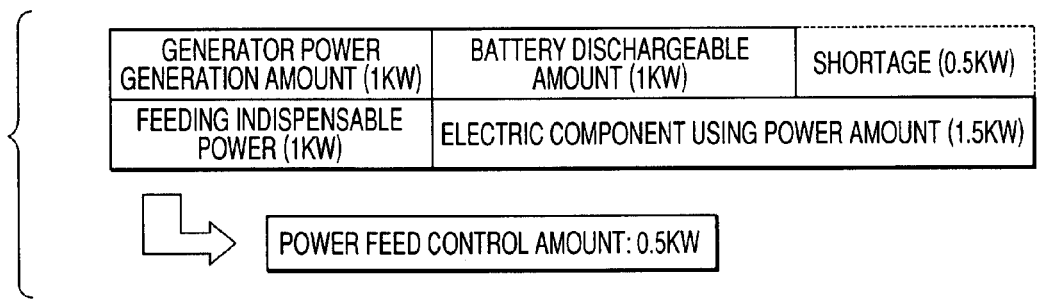
FIG. 17 is a view illustrating a power feeding restricting method.

[FIG. 17]
generator power generation amount
battery dischargeable amount
shortage
feeding indispensable power
electric component using power amount
power feed control amount

Figure 18:
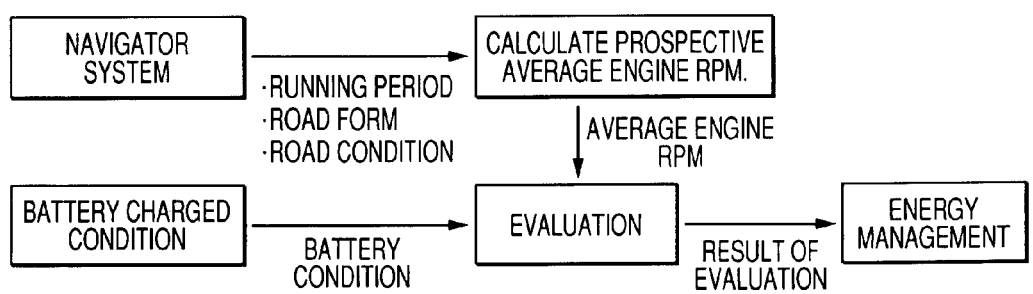
FIG. 18 is a view showing a function of controlling the amount of power generation based on a predicting result of a running prediction unit.

[FIG. 18]
Navigator system
  Running period
  Road form
  Road condition
Calculate prospective average engine RPM.
  Average engine RPM
Battery charged condition
  Battery condition
Evaluation
  Result of evaluation
Energy management

[FIG. 19]
see FIG. 10
41 electric component using power amount determining part
71 electric component using power change predicting part

[FIG. 20]
see FIG. 11
504 detect electric component using power
505 predict change of electric component using power

Figure 21:
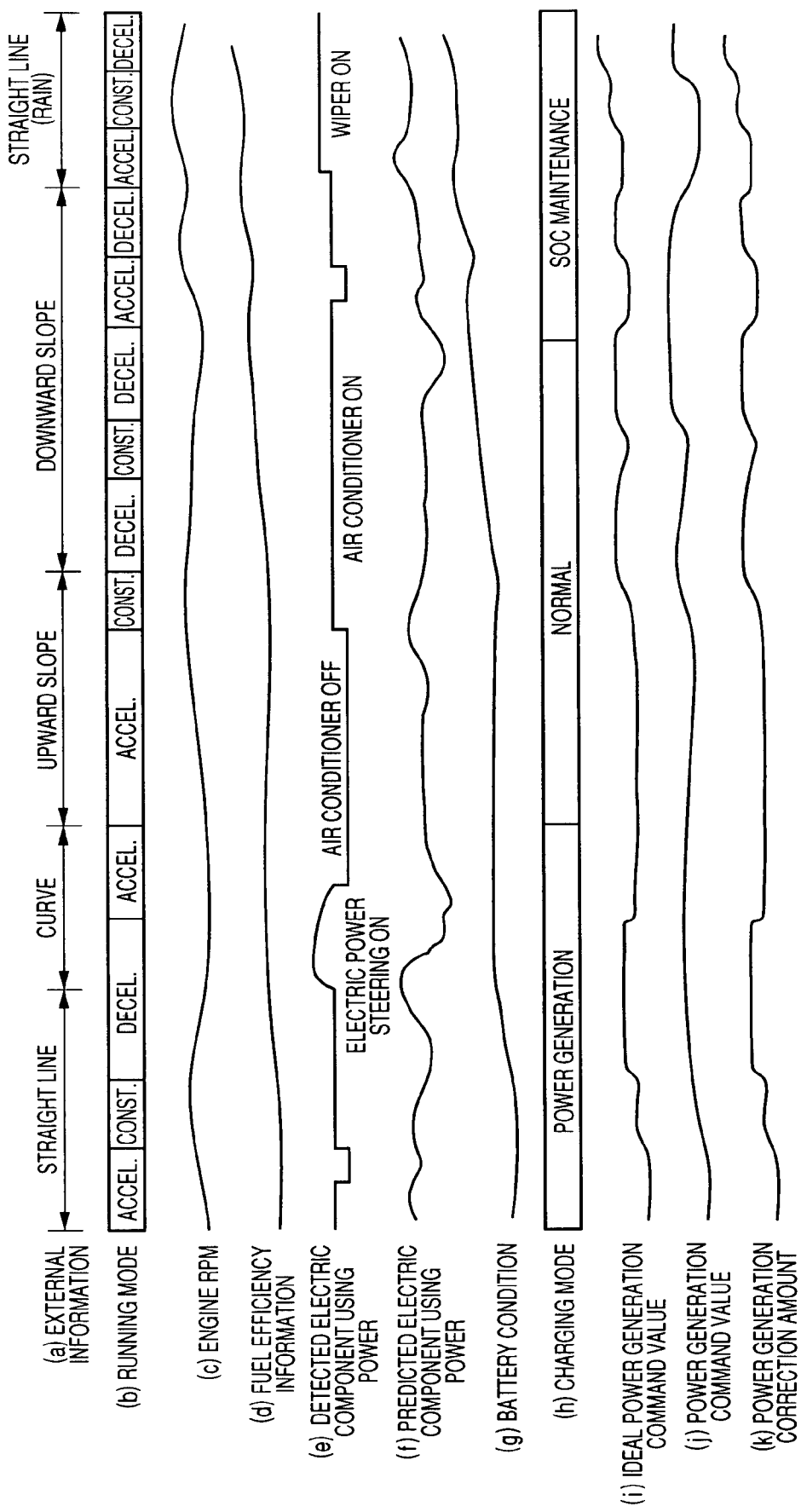
FIG. 21 is a view showing an example of parameters related to a power generation control, which are predicted based on external information.

[FIG. 21]
see FIG. 12
(e) detected electric component using power
(f) predicted electric component using power

[FIG. 22]
see FIG. 14
41 electric component using power amount determining part
71 electric component using power change predicting part

What is claimed is:

1. A power control apparatus operable to perform a power generation control of a generator which feeds to electric components mounted on a vehicle, the power control apparatus comprising:
   a power generation amount determining unit operable to determine a first power generation amount to be generated by the generator based on a first power consumed by an electric component which is currently activated in the electric components and a feeding indispensable power required in a case where an electric component related to a safety system for avoiding collision of the vehicle or reducing an impact of the collision of the vehicle is activated,
   wherein the power generation amount determining unit changes the feeding indispensable power depending on a running mode of the vehicle.

2. The power control apparatus as set forth in claim 1, wherein the electric component related to the safety system includes at least one of an airbag system, an anti-brake system, a pre-crush system, and a skidding prevention system.

3. The power control apparatus as set forth in claim 1, wherein the feeding indispensable power which is to be changed depending on the running mode of the vehicle is required in a case where the electric component which is related to the safety system and is currently deactivated is activated.

4. The power control apparatus as set forth in claim 1, wherein the power generation amount determining unit determines the feeding indispensable power of an electric component which is related to the safety system predicted to be activated based on the running mode of the vehicle and external information acquired from a navigation system.

5. A power control method for performing a power generation control of a generator which feeds to electric components mounted on a vehicle, the power control method comprising:

determining a first power consumed by an electric component which is currently activated in the electric components;

determining a feeding indispensable power required in a case where an electric component related to a safety system for avoiding collision of the vehicle or reducing an impact of the collision of the vehicle is activated;

determining a first power generation amount to be generated by the generator based on the first power and the feeding indispensable power, wherein the feeding indispensable power is changed depending on a running mode of the vehicle.

* * * * *